United States Patent
Zeng et al.

(10) Patent No.: US 12,159,256 B1
(45) Date of Patent: Dec. 3, 2024

(54) LOCATION-BASED PACKAGE VISUAL DELIVERY INSTRUCTIONS

(71) Applicant: Amazon Technologies, Inc., Seattle, WA (US)

(72) Inventors: Chengeng Zeng, Seattle, WA (US); Leah Autumn Thompkins, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 17/208,944

(22) Filed: Mar. 22, 2021

(51) Int. Cl.
G06Q 10/0833 (2023.01)
G06Q 10/0832 (2023.01)
G06T 19/00 (2011.01)
H04W 4/021 (2018.01)

(52) U.S. Cl.
CPC ..... G06Q 10/0833 (2013.01); G06Q 10/0832 (2013.01); G06T 19/006 (2013.01); H04W 4/021 (2013.01)

(58) Field of Classification Search
CPC .......................... G06Q 10/0833; G06Q 10/083
See application file for complete search history.

(56) References Cited

U.S. PATENT DOCUMENTS

| | | |
|---|---|---|
| 9,743,239 B1 | 8/2017 | Mishra |
| 10,262,290 B1 | 4/2019 | Mossoba et al. |
| 10,373,377 B1 | 8/2019 | Niewiadomski |
| 2008/0255758 A1 | 10/2008 | Graham et al. |
| 2015/0066799 A1* | 3/2015 | Scipioni ............. G06Q 10/0833 705/337 |
| 2015/0302495 A1* | 10/2015 | Stuckman ............. G01S 1/7034 705/26.35 |
| 2016/0292635 A1* | 10/2016 | Todasco ................ H04W 4/023 |
| 2017/0011254 A1 | 1/2017 | Guo et al. |
| 2017/0236091 A1* | 8/2017 | Putcha ............... G06Q 10/0833 705/333 |
| 2019/0043004 A1 | 2/2019 | Lesieur et al. |
| 2019/0161190 A1* | 5/2019 | Gil ........................... B64F 1/22 |
| 2020/0074386 A1* | 3/2020 | Mossoba ............... G06F 40/205 |

(Continued)

OTHER PUBLICATIONS

Smiota, "Stop Stolen Packages Without Checking "Signature Required"," smiota.com, Jul. 30, 2019, Retrieved from https://smiota.com/resources/stop-stolen-packages-without-checking-signature-required/). (Year: 2019).*

(Continued)

*Primary Examiner* — Shannon S Campbell
*Assistant Examiner* — Bryan J Kirk
(74) *Attorney, Agent, or Firm* — Lee & Hayes, P.C.

(57) ABSTRACT

A system can be configured to receive and analyze an image captured by a customer at a delivery location to enable identification and verification of the delivery location upon arrival of a deliverer at the delivery location. The system can utilize algorithms trained to determine identifying features of the delivery location from the image and/or provide the image to the deliverer for manual verification. The system can provide the deliverer with the image and additional information specific to the delivery location based on one or more geofences associated with the delivery location. The image, the additional information and the manner of presentation can be configured to guide the deliverer to approved drop-off locations and ensure package placement for delivery to a customer.

20 Claims, 7 Drawing Sheets

(56) References Cited

U.S. PATENT DOCUMENTS

| | | |
|---|---|---|
| 2020/0279208 A1 | 9/2020 | Kumar et al. |
| 2021/0406825 A1 | 12/2021 | Lee et al. |
| 2022/0027845 A1 | 1/2022 | Silverstein et al. |
| 2022/0083964 A1* | 3/2022 | Silverstein .......... G06F 18/2431 |
| 2022/0180282 A1* | 6/2022 | Powell ............. G06Q 10/06316 |
| 2022/0222449 A1 | 7/2022 | Zotto et al. |

OTHER PUBLICATIONS

Office Action for U.S. Appl. No. 17/031,682, mailed on Jan. 12, 2023, Zheng Wang, "Location-Based Package Drop-Off Instructions", 41 pages.
Office Action for U.S. Appl. No. 17/031,682, mailed on Apr. 24, 2023, Zheng Wang, "Location-Based Package Drop-Off Instructions", 41 pages.
"Seeing the Future: Augmented Reality and the Postal Service", United States Postal Service, RARC Report, Apr. 6, 2015, pp. 1-20.

\* cited by examiner

LOCATION-BASED PACKAGE VISUAL DELIVERY INSTRUCTIONS

BACKGROUND

Presently, delivery of customer packages to a delivery location associated with a customer is accomplished through an individual navigating to the delivery location (e.g., a house, business, apartment building, etc.), identifying a drop-off location at the delivery location (e.g., a door, steps, etc.), and leaving the customer package at the drop-off location. However, as navigation software only directs the individual to the general location of the delivery location, the identification of the true delivery location and acceptable drop-off locations at the delivery location is left to the individual to identify. Additionally, the address and/or other standard identifying symbols for the delivery location may be obscured or otherwise out of sight for the individual during delivery. Accordingly, many delivery defects are caused by the customer package being placed at a drop-off location that is not associated with the delivery location due to misidentification of the delivery location. Such delivery defects result in customer packages not being received by the customer and being marked as delivered not received, inflicting both concession costs for correcting the error for the customer and negative public opinion regarding the reliability of the entity facilitating the delivery.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
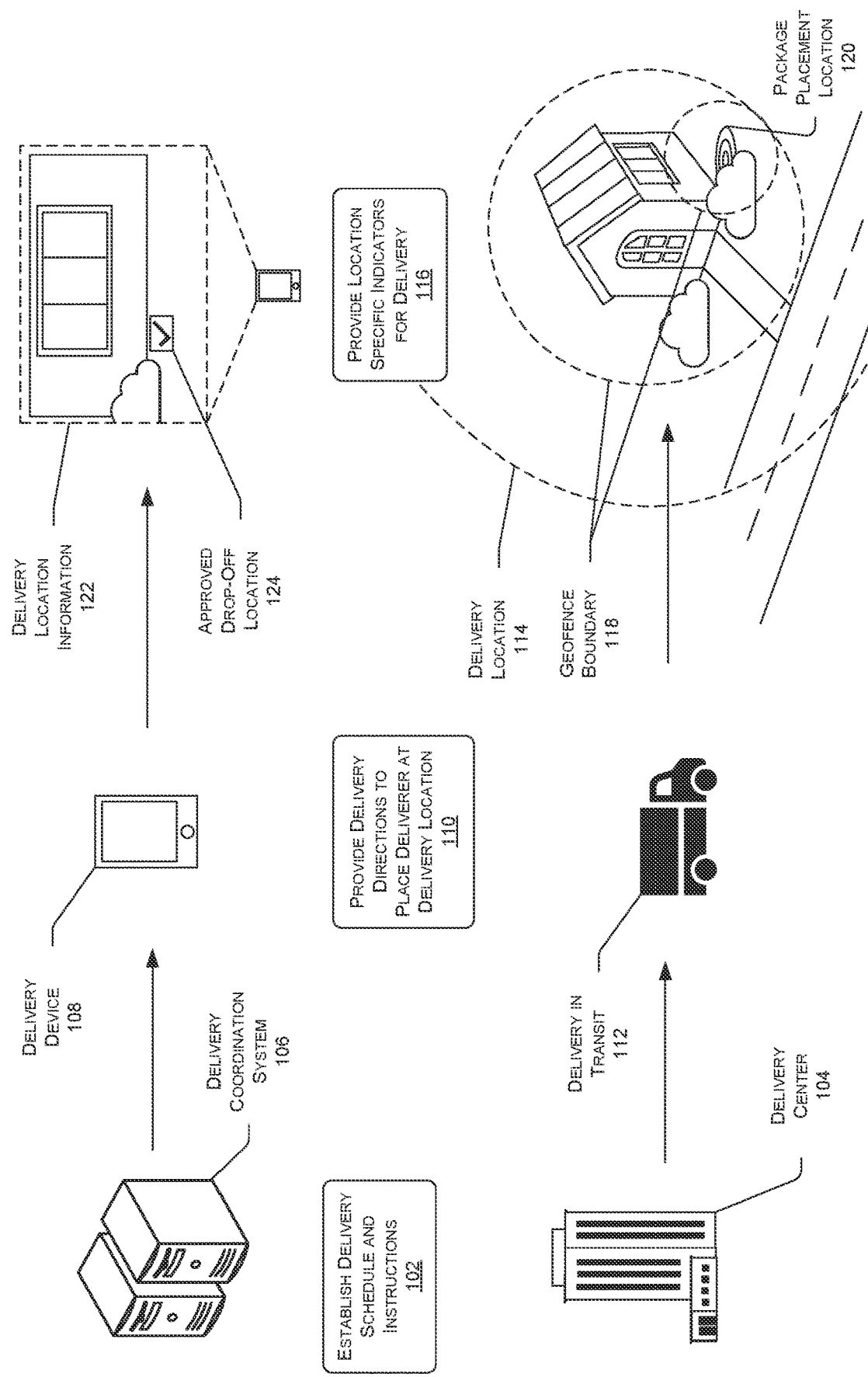
FIG. 1 illustrates an example delivery system that provides delivery location information obtained from a customer that assists a deliverer in identifying a delivery location and an approved drop-off location for a package.

Described herein are techniques for providing delivery confirmation regarding the placement of packages at delivery locations. In some examples, the techniques can be utilized to generate visual guidance that assists deliverers (e.g., individuals who are responsible for delivery of packages to delivery locations of customers) while the deliverers are identifying a delivery location associated with a package. In particular, a deliverer device of the deliverer may receive images, video, or other location information upon arrival to an area surrounding the delivery location. Additionally, location information specific to the delivery location can be analyzed according to the described techniques to assist identification of the delivery location by the deliverer. Further, the location information can be utilized to generate indications of appropriate or approved drop-off locations for the customer package(s), package drop-off location approval (before or after placement), package drop-off location rejection (before or after placement), and rejected or disapproved drop-off locations. Accordingly, identification of both delivery location and package placement within the delivery location can increase the number of successful package deliveries and reduce the number of packages that are actually delivered but not received by customers, potentially due to theft or the packages being placed in incorrect or unapproved locations.

In some examples, the techniques described herein provide assistance to a deliverer delivering a package to a delivery location associated with a customer to a safe location where the package can be obtained at the discretion of the customer. In particular, through the utilization of a deliverer device (e.g., a user device or a company device), a deliverer can be provided with a user interface that includes accurate delivery location information and package placement information that is generated to enable the deliverer to complete delivery of the package to a package placement location requested or specified by the customer. The deliverer can receive the guidance provided by the described techniques through alerts, notifications, user interface elements, and other communication pathways utilizing the deliverer device associated with the deliverer. The guidance can include images, videos, audio, and/or other media that enables the deliverer to identify the delivery location where standard identifiers (e.g., house numbers, mailbox numbers, other address indicator, etc.) are obscured, absent, damaged, and/or otherwise unavailable in the identification of the delivery location. Accordingly, the deliverer can be provided the delivery location information that enables the deliverer to identify the delivery location independent of the availability of the standard identifiers.

In some additional examples, the user interface can include delivery location information that is provided by the customer requesting delivery of the package. In particular, the customer can be provided a customer interface during placement of a delivery order such that the customer can provide identifying information for the delivery location and the package placement location. More specifically, the customer can submit information (e.g., an audio file, a video file, an image file, a text file, etc.) that includes instructions and/or guidance related to the delivery location. For example, the customer provided information can include a video that displays a route to an approved drop-off location, an image that displays a street view of the delivery location, an audio description that guides a deliverer to the delivery location, and/or other delivery location information that provides assistance to the deliverer in identifying the delivery location and/or where the package is to be placed. Additionally, the customer can utilize the customer interface to upload delivery location information that is associated with a plurality of package placement locations within the delivery location, wherein the plurality of package placement locations can individually be associated with different package sizes, different package values, and/or other differentiating qualities. Accordingly, the customer can provide delivery location information that enables the deliverer to successfully identify the delivery location during delivery of the package. Further, the delivery location information can assist the deliverer by identifying the package placement location, locations to be avoided, safe drop-off locations, unsafe drop-off locations, and other indications that provide delivery location specific information to the deliverer.

It should be noted that the delivery location can generally refer to the property, building, and/or other destination associated with the customer that the package is to be delivered to (e.g., a house and the surrounding property, an office building, a business premise, etc.). In particular, the delivery location refers to an area or a zone that is associated with the customer that the customer has requested delivery of a package to. This can include a residence of the customer, land surrounding the residence of the customer, a building associated with the customer (e.g., an apartment building or an office building), a park where the customer is currently located, a vehicle associated with the customer, and/or a general vicinity associated with the customer. Additionally, the package placement location can generally refer to a smaller area within the delivery location where packages are to be placed for delivery (e.g., a front porch, a mail room, a back office, etc.). Further, the package placement location can include an approved drop-off location and/or a rejected drop-off location, wherein the approved drop-off location can refer to a specific position that the customer has identified for placement of the package (e.g., on the front porch behind a flower pot, on a desk within the mail room, in a cabinet within the back office, etc.). In contrast, a rejected drop-off location can refer to specific positions that the customer has indicated packages are not to be placed (e.g., a driveway, stairs to the front porch, in front of a residence door, on the floor, etc.).

In some further examples, delivery location information provided by the customer for the deliverer during delivery of the package to the delivery location can be analyzed to identify the delivery location information. In particular, the information provided by the customer can be utilized for a plurality of packages that are delivered to the delivery location. Additionally, and based at least in part on the duration that the delivery location information is utilized, the delivery location information provided by the customer can be reviewed by the deliverer that delivers each package of the plurality of packages. For example, the deliverer can flag an image of a house as having been repainted and/or remodeled such that updated delivery location information is received from the customer. Alternatively, or in addition, the delivery location information provided by the customer can be compared with alternative sources of information to determine whether the delivery location information provides sufficient identifying characteristics for the deliverer to compare against the delivery location. For example, an image that includes a white slat wall bordering a lawn could be flagged by an algorithm, a deliverer, or other administrator associated with the delivery as lacking sufficient identifying characteristics based on a set of guidelines for identifying delivery locations (e.g., images should contain at least one of a front door, a window, a landscaping feature, etc. that is viewable from the street). In contrast, an image of a front door, a patio, and a walkway on a street facing side of a house could be accepted as including sufficient detail. Further, the delivery location information can be modified to highlight the identifying characteristics (e.g., cropping the image of the street facing side of the house to only depict the front door and patio). Accordingly, the delivery location information can be analyzed to ensure that the image (or other media) enables the deliverer to properly identify the delivery location and verify that the delivery location is associated with the customer.

In some examples, the deliverer and or the deliverer device can provide location information and receive guidance in real-time upon arriving to an area surrounding the delivery destination associated with the customer. It should be noted that while the deliverer is commonly referred to as an individual and/or a human, the deliverer does not need to be human. In at least one example, the deliverer can be an unmanned aerial vehicle (UAV), a ground-based delivery robot, or another autonomous/semi-autonomous entity configured to deliver a package to a delivery location of a customer. For instance, delivery of a package may be automated and controlled by the delivery instructions and/or a computing device that generates the delivery instructions, determined in an analysis environment, and transmitted to the deliverer. Additionally, the analysis environment can determine whether the autonomous deliverer has placed the package in a rejected drop-off location and transmit additional instructions that cause the autonomous deliverer to relocate the package to an approved drop-off location.

In some examples, the techniques described herein further verify package placement at the delivery location associated with the customer. As noted above, a user device associated with the deliverer can provide delivery location information associated with an area surrounding the delivery location. The area can include other houses that are within a distance threshold of a house of the customer, an apartment building that include numerous residences besides the residence of the customer, and other environments that are located at the general area surrounding the delivery location where the package is to be delivered. It should be noted that, while global positioning systems, navigation tools, and other guidance systems can be capable of directing a deliverer to the general area associated with a delivery location and/or a customer, such guidance systems may struggle to ensure that the package is actually delivered to an appropriate drop-off location for the customer. Accordingly, the location information received from the user device can be utilized to identify appropriate drop-off locations while preventing the package from being placed at inappropriate drop-off locations. Further, the user device can be utilized to confirm placement of the package at the delivery location for both the deliverer and the customer.

In some examples, the described techniques can utilize machine learning algorithms and/or other artificial intelligence (AI) techniques (e.g., neural networks) to analyze information provided by the customer regarding the delivery location. In particular, the machine learning algorithms (or other AI techniques) can be utilized to analyze and/or parse the information received from the customer to determine the delivery location information that is to be presented to the deliverer upon arrival at the delivery location. More specifically, the machine learning algorithms (or other AI techniques) can be trained to receive media from the customer, analyze the media to identify the delivery location information, determine a score for the delivery location information generated from the media, and determine whether additional and/or replacement media should be submitted by the customer. Additionally, the machine learning algorithms can be trained to identify a package placement location provided by the customer via delivery location information described by the media. The package placement location can be annotated to emphasize, for the deliverer, an approved drop-off location where the deliverer is to place the package. In at least one example, the delivery location information and the package placement location can be collected from a plurality of delivery locations. Additionally, the results of the deliveries made to the delivery locations can be tracked and associated with the delivery location information and the package placement information provided by the customers associated with the plurality of delivery locations. Alternatively, or in addition, the delivery location information and the package placement information for the plurality of delivery locations can be captured, at least in part, by one or more deliverers at the plurality of delivery locations. Further, the delivery location information, the package placement information, customer indications regarding the delivery locations, delivery results (e.g., customer received package, package was delivered not received, customer reported a complaint with the delivery, etc.), and other delivery information can be associated within a database. The delivery location information and other delivery information associated with the plurality of delivery locations can be analyzed and utilized to ensure accurate identification of the plurality of delivery locations and/or additional delivery locations associated with additional package deliveries and delivery of the packages to the customers.

In some examples, a user device associated with the deliverer can be utilized to verify package placement at the delivery location. In particular, the user device can be utilized to capture images, video, and other location information associated with an area that the deliverer has been directed to for package delivery. Additionally, the user device or a server associated with the user device can receive the captured images and location information during and after delivery of the package to verify that the package has been delivered to the delivery location and that the package has been correctly delivered to an acceptable drop-off location. For instance, the algorithms can receive one or more images of the delivery location and/or the package placed at the delivery location. Further, the algorithms can analyze the one or more images and identify unique features within those images and compare those unique features to known features that have been recorded for the delivery location in the past. From the comparison of the unique features captured in the one or more images and the known features associated with the delivery location, the algorithm can verify the delivery location and confirm that the package is being placed at the correct delivery location. Additionally, in some additional examples, the one or more images can depict the package placed at the delivery location. Accordingly, the algorithms can determine whether the placement of the package at the delivery location satisfies one or more delivery criterion or whether the package is to be relocated at the delivery location.

Currently, when a deliverer arrives at a potential delivery location, the deliverer commonly relies on a house number and/or other indicators of address to confirm that the potential delivery location is a delivery location associated with a package. However, in practice, the process of identifying the potential delivery location as the delivery location can be impeded by obscured indications of address, a lack of illumination at the potential delivery location, and/or other difficulties in identifying the potential delivery location. For example, bushes, trees, portions of a building at the delivery location, and/or another obstacle at the potential delivery location can prevent the deliverer from viewing the indications of address. Accordingly, and independent of how the address of the delivery location is obscured, the deliverer arriving at the potential delivery location would be unable to make the determination that the potential delivery location is the delivery location associated with the package without traveling (e.g., walking, driving, flying, etc.) to other locations surrounding the potential delivery location in an attempt to confirm that the potential delivery location is the delivery location. Further, the process of confirming the potential delivery location as the delivery location can cause various defects such as late delivery of the package, as well as late delivery of subsequently delivered packages by the deliverer, packages not being received, packages being stolen, packages being misplaced, and other delivery defects. This can be compounded when the customer associated with the package requests unconventional delivery locations such as behind a particular feature of the delivery location, distinct package placement locations, and other unconventional requests.

FIG. 1 illustrates an example delivery system that provides delivery location information obtained from a customer that assists a deliverer in identifying a delivery location and an approved drop-off location for a package. In particular, FIG. 1 illustrates a first step 102 that comprises establishing a delivery schedule and delivery instructions for a deliverer at a delivery center 104 and via a delivery coordination system 106. Additionally, a deliverer device 108 can be configured to perform a second step 110 of providing delivery directions that place the deliverer at a delivery location while the delivery 112 is in transit. Further, once the deliverer arrives at the delivery location 114, the deliverer device 108 can be configured to perform a third step 116 of providing location specific indicators for delivery of the package. For instance, the deliverer device 108 can be configured to utilize one or more geofence boundaries 118 to assist the deliverer in identifying a package placement location 120 within the delivery location 114. Additionally, the deliverer device 108 can display a user interface that includes delivery location information 122 that can provide additional information that identifies the approved drop-off location 124. It should be noted that, while FIG. 1 depicts a particular process for assisting the deliverer in delivering the package to the delivery location 114, the process of obtaining the delivery location information 122 and displaying the delivery location information 122 can include one or more additional steps and/or considerations beyond what is depicted by FIG. 1. The delivery location information 122 can include a plurality of images and/or other information (e.g., audio, video, text, etc.) describing the delivery location 114 and/or the approved drop-off location 124. Further, the delivery location information 122 provided to the deliverer can be modified based on the geofence boundaries 118 and/or other delivery location modifiers.

In some examples, the first step 102 can include a deliverer arriving at the delivery center 104 (e.g., a fulfillment center, a warehouse, etc.) to collect one or more packages that are to be delivered to one or more delivery locations 114. In particular, the deliverer can be assigned one or more deliveries for one or more delivery locations 114. It should be noted that the deliverer can be instructed to report to the delivery center 104 to collect the one or more packages for delivery or the deliverer can request that the one or more packages be assigned for delivery to the deliverer. For example, the deliverer can schedule an amount of time for delivery of packages with the delivery coordination system 106. Additionally, the delivery coordination system 106 can receive the amount of time that the deliverer is available to deliver packages, determine an estimated amount of time for delivering a plurality of packages, and determine a set of packages that can be delivered by the deliverer within the amount of time provided, possibly including an order in which the packages are to be delivered to corresponding delivery locations 114. Upon arrival at the delivery center 104, the deliverer can check in with the delivery coordination system 106 and receive the set of packages that are to be delivered during the amount of time. Additionally, upon receiving the set of packages, the delivery coordination system 106 can be configured to associate the set of packages with the deliverer and provide the delivery location information 122 associated with the set of packages. For instance, the deliverer can utilize the deliverer device 108 (e.g., a personal user device of the deliverer, a user device associated with the delivery center 104, a user device associated with a third party service, etc.) to interact with the delivery coordination system 106 to provide the amount of time and receive the delivery location information 122 for the delivery locations 114 of the set of packages. Further, the deliverer device 108 can be utilized to scan, image, and/or otherwise record one or more indicators (e.g., barcodes, confirmation numbers, QR codes, etc.) associated with the set of packages such that transfer of the set of packages to the deliverer is confirmed. Accordingly, the delivery coordination system 106 can register that the set of packages has been provided by the delivery center 104, associate the set of packages with the deliverer (e.g., an indication that the set of packages has been assigned to and transferred to the deliverer in a database), and provide the delivery location information 122 to the deliverer device 108.

In some examples, the first step 102 can include the deliverer device 108 being provided with the delivery location information 122 associated with the set of packages by the delivery coordination system 106. In particular, and as noted above, the delivery coordination system 106 associated with the delivery center 104 can be configured to generate a delivery schedule and the delivery location information 122 related to the individual delivery locations 114 associated with the set of packages. More specifically, the delivery coordination system 106 can be configured to determine navigation information that guides the deliverer to the generate vicinity of the delivery location 114, whether a customer has provided delivery location information 122 for each of the packages that are to be delivered by the deliverer, whether the customer has previously provided delivery location information 122 for the delivery location 114, whether the customer has provided feedback regarding previous packages delivered to the delivery location 114, and/or whether a previous deliverer has provided delivery location information 122 during and/or after a previous delivery. Accordingly, the delivery coordination system 106 can be configured to identify delivery location information 122 for a package of the set of packages that is to be delivered to the delivery location 114 based at least on the delivery location information 122 that has been submitted by the customer and/or previous deliverers in association with the delivery location 114. It should be noted that the delivery location 114 can include a structure, for example a residence (e.g., house) or an establishment (e.g., building associated with a business), that is associated with the customer that has placed an order for one or more items to be delivered.

Alternatively, or in addition, the delivery location 114 can include an entry way to a portion of a building (e.g., an apartment), an area external to a building (e.g., a driveway, sidewalk, porch, etc.), or another delivery location that is associated with the customer, but not necessarily a building or a structure. Accordingly, the delivery coordination system 106 can be configured to receive information from a variety of sources, analyze the information, generate the delivery location information 122, and provide the delivery location information 122 such that the deliverer of the package can utilize the delivery location information 122 to verify that the delivery location 114 is the correct delivery location for the package and/or to navigate the delivery location 114.

In some examples, the delivery coordination system 106 can be configured to provide the delivery location information 122 to the deliverer without a data connection between the delivery coordination system 106 and the deliverer device 108. In particular, the delivery coordination system 106 can generate the delivery location information 122 and provide the delivery location information 122 to the deliverer device 108 so that the deliverer is presented with the delivery location information 122 relevant to a portion of the delivery process. For example, the deliverer device 108 and the delivery location information 122 can be configured to provide navigation information when the deliverer is travelling between the delivery center 104 and individual delivery locations, delivery location identification information when the deliverer arrives at the delivery location 114, and package placement information while the deliverer is completing the delivery of a package. Additionally, the delivery coordination system 106 can cause the deliverer device 108 to modify the delivery location information 122 displayed to the deliverer based at least on an indication provided by the deliverer that a portion of the delivery process has been completed. As noted above, the portions of the delivery process can include steps such as travelling between an origin point (e.g., the delivery center 104, a previous delivery location, etc.) and the delivery location 114, verifying that the delivery location 114 is the correct delivery location for the package, confirming that the package has been placed at the package placement location 120, and completing the delivery of the package to the delivery location 114. Alternatively, or in addition, the delivery coordination system 106 can be configured to modify the delivery location information 122 and provide the delivery location information 122 to the deliverer device 108 such that a location of the deliverer device 108 and/or the deliverer is tracked and compared against geofence boundaries 118. Further, the delivery coordination system 106 can cause the deliverer device 108 to present subsets of the delivery location information 122 (e.g., the navigation information, the delivery location identification information, the package placement information, etc.) to the deliverer based at least on the location and the geofence boundaries 118. Accordingly, the deliverer device 108 and the delivery location information 122 can be configured by the delivery coordination system 106 to present relevant information during various steps of the delivery process.

In some examples, the delivery coordination system 106 can be configured to provide the delivery location information 122 to the deliverer via a data connection that can be established during delivery and/or maintained throughout the delivery. In particular, the delivery coordination system 106 can be configured to establish and/or maintain a data connection with the deliverer device 108 such that the deliverer device 108 can report information (e.g., location information, deliverer indications, confirmation messages, etc.) to the delivery coordination system 106 and receive delivery location information 122 relevant to individual steps of the delivery process. For example, the deliverer device 108 can report to the delivery coordination system 106, via the data connection, that the delivery of a first package has been initiated and the delivery coordination system 106 can transmit navigation information of the delivery location information 122 to the deliverer device 108. Additionally, the deliverer device 108 can report that the deliverer has arrived at the delivery location 114, such as reporting a deliverer device location that is within a first geofence of the geofence boundaries 118 that defines the delivery location 114, and the delivery coordination system 106 can transmit delivery location identification information to the deliverer device 108. Further, the deliverer device 108 can report a confirmation that the delivery location 114 is the correct delivery location for the package and the delivery coordination system 106 can transmit package placement information that directs the deliverer to place the package at the package placement location 120. Accordingly, the deliverer device 108 and the delivery location information 122 can be configured by the delivery coordination system 106 to present relevant portions of the delivery location information 122 during various steps of the delivery process.

In some examples, and at the second step 110, the deliverer device 108 provides navigation information that enables the deliverer to arrive at the general vicinity of the delivery location 114. As noted above, the navigation information can be generated and provided to the deliverer device 108 by the delivery coordination system 106 while the deliverer is at the delivery center 104 and/or be provided to the deliverer device 108 by the delivery coordination system 106 via a data connection. The navigation information can be a series of directions that indicate a path the deliverer is to take in order to reach the delivery location 114, directions that are generated based at least in part on a location of the delivery 112, and/or other instructions that cause the deliverer to arrive at the delivery location 114. For example, the navigation information can include an indication of a location of the deliverer, such as a global positioning system (GPS) location determined by the deliverer device 108 or another location tracking device. Accordingly, the deliverer and the delivery 112 can be routed, by the navigation information generated at least in part by the delivery coordination system 106, to the delivery location 114 associated with the customer.

In some examples, and at step three 116, the delivery location information 122 can be configured to provide location specific indicators for the delivery 112. In particular, the delivery location 114 can be split up into one or more zones by the delivery location information 122 after the deliverer is determined to have arrived at the delivery location 114 (e.g., once navigation has placed the deliverer within a distance threshold of the delivery location 114). More specifically, the delivery location 114 can be subdivided into zones such as a near zone, a middle zone, and a far zone. It should be noted that any combination of these zones and additional zones can be incorporated based on the features of a specific delivery location. In general, the far zone is associated with the delivery location information 122 for identifying the delivery location 114 as the correct delivery location for the package, the middle zone is associated with the delivery location information 122 that is configured to direct the deliverer to the package placement location 120, and the near zone is associated with delivery location information 122 configured to ensure proper placement of the package at the approved drop-off location 124.

Additionally, the delivery thresholds associated with the near zone, the middle zone, the far zone, and/or any other zones associated with the delivery location 114 can be generated by the delivery coordination system 106 based at least in part on the delivery location 114. For example, the delivery location 114 can be a rural location that is associated with a larger distance threshold to identify the delivery location 114 from the far zone due to the house, residence, building, or other package placement location associated with the package being out of sight for the deliverer upon arrival.

In at least one example of step three 116, the delivery location information 122 associated with the far zone of the delivery location 114 can be defined by an outer geofence of the geofence boundaries 118 that is associated with an outer boundary of the delivery location 114 and an inner geofence of the geofence boundaries 118 that is associated with a boundary between the far zone and the middle zone (or other zone that located at least partially between the far zone and the middle zone). The outer geofence can at least partially define a substantially symmetrical area or a substantially asymmetrical area that is associated with a distance threshold (e.g., constant distance threshold defines a circular area, a variable distance threshold can define a square or triangular area, or an additional variable distance threshold can define an asymmetrical area). Similarly, the inner geofence can at least partially define the substantially symmetrical area or the substantially asymmetrical area with an additional distance threshold. Alternatively, the far zone of the delivery location 114 can overlap with at least one of the middle zone, the near zone, and/or any additional zones of the delivery location 114 such that the delivery location information 122 provided to assist in the identification of the delivery location 114 remains available throughout the delivery 112 upon arrival at the delivery location 114.

In at least one additional example of step three 116, the delivery location information 122 associated with the delivery location 114 can include the middle zone. In particular, the middle zone can be defined at least in part by an outer geofence that is be associated with the delivery location 114 such that the outer geofence represents a distance threshold where the deliverer is entering the delivery location 114, the deliverer is to be provided instructions for reaching the package placement location 120 within the delivery location 114, and/or otherwise indicates that the deliverer is to be provided assistance for reaching the package placement location 120. The outer geofence of the middle zone can define the inner geofence of the far zone as noted above. Additionally, the middle zone can be defined at least in part by an inner geofence of the middle zone. The inner geofence of the middle zone can represent an additional distance threshold that indicates the deliverer has been directed to the package placement location 120. As discussed above, the outer geofence can at least partially define a substantially symmetrical area or a substantially asymmetrical area that is associated with the distance threshold and the inner geofence can at least partially define the substantially symmetrical area or the substantially asymmetrical area with the additional distance threshold.

It should be noted that the geofence boundaries 118 can be located within the delivery location 114 and/or around the delivery location 114. In particular, the geofence boundaries 118 can be configured to identify any area that is associated with the delivery location 114. For example, the geofence boundaries 118 can be configured to define the delivery location 114 and/or portions of the delivery location 114. Alternatively, or in addition, the geofence boundaries 118 can include portions of surrounding delivery locations (e.g., a geofence boundary 118 includes portions of an apartment building that are not a part of the delivery location 114), additional areas that are unassociated with the delivery location 114 (e.g., a geofence boundary 118 includes a portion of a public street that is near the delivery location 114), and/or other areas that may assist the deliverer in identifying the delivery location 114.

In at least one further example of step three 116, the delivery location information 122 associated with the delivery location 114 can include the near zone. In particular, the near zone can be defined at least in part by an outer geofence that is be associated with the delivery location 114 such that the outer geofence represents a distance threshold where the deliverer is entering the package placement location 120, the deliverer is to be provided instructions for placing the package within the package placement location 120, and/or otherwise indicates that the deliverer is to be provided assistance for placing the package at the approved drop-off location 124. The outer geofence of the near zone can define the inner geofence of the middle zone as noted above. As discussed above, the outer geofence can at least partially define a substantially symmetrical area or a substantially asymmetrical area that is associated with the distance threshold.

In some examples, and as noted above, the various zones described within the delivery location information 122 and associated with the delivery location 114 can be configured to modify information available and/or displayed via the deliverer device 108 during the delivery 112. In particular, the deliverer device 108 can be configured, by the delivery coordination system 106, to display at least a subset of the delivery location information 122 based at least in part on the zone of the delivery location 114 that the deliverer is determined to be within. Additionally, the deliverer device 108 can be configured to automatically modified the available delivery location information 122 as the deliverer enters different zones of the deliver location and/or to modify the available delivery location information 122 based at least on an indication from the deliverer that a portion of the delivery process has been completed. Accordingly, the deliverer can be provided with at least the relevant portion of the delivery location information 122 for the verification of the delivery location 114, for the identification of the package placement location 120, and for authenticating that the delivery 112 has been completed via placement of the package at the approved drop-off location 124. It should be noted that after the package has been placed at the approved drop-off location 124, the deliverer can scan an indicator to confirm that the package has been delivered (e.g., a barcode, a QR code, etc.).

Figure 2:
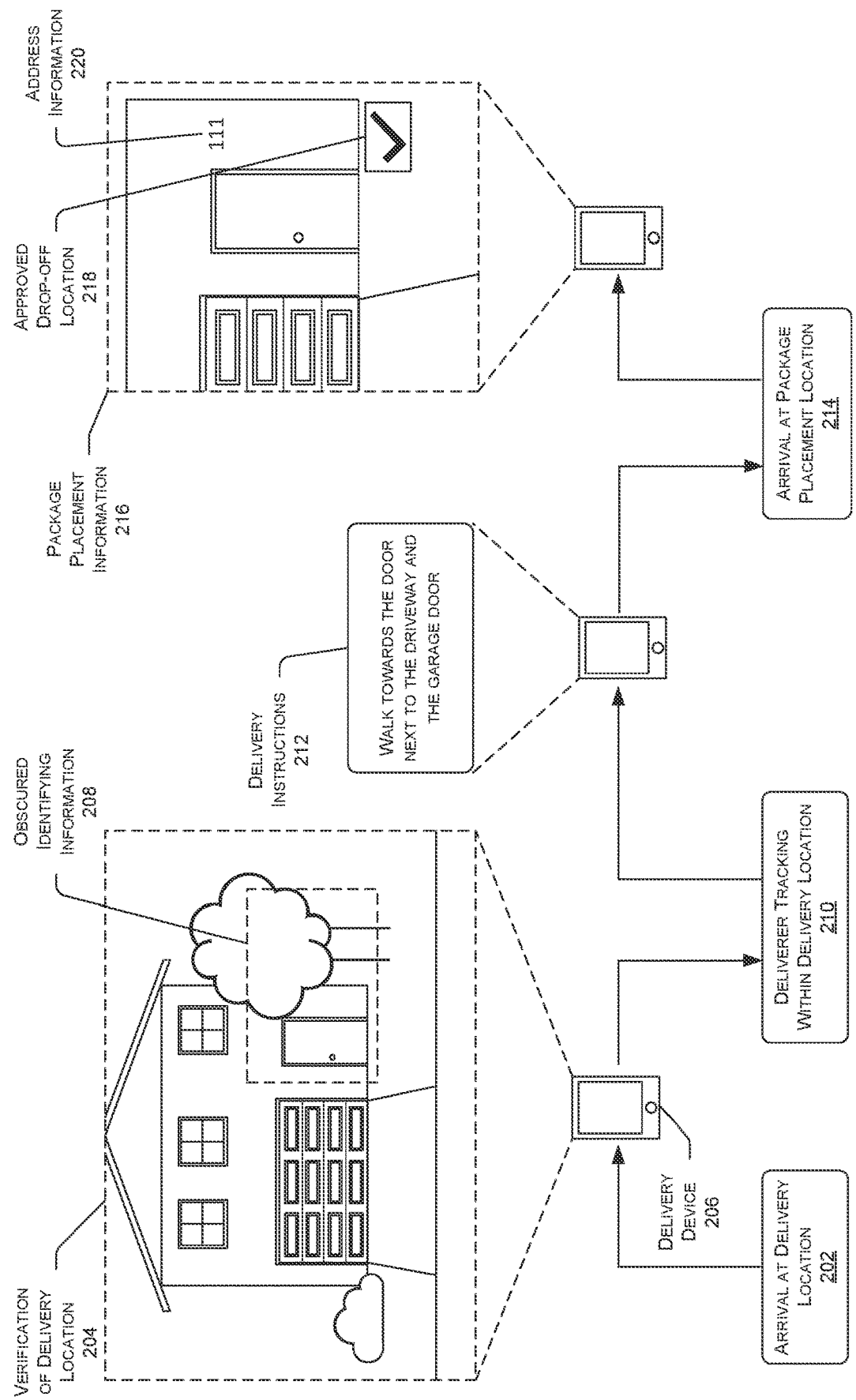
FIG. 2 illustrates an example delivery process for causing a deliverer to place a package within an approved drop-off location at a delivery location for a customer.

FIG. 2 illustrates an example delivery process for causing a deliverer to place a package within an approved drop-off location at a delivery location for a customer. In particular, and upon arrival at a delivery location 202, the deliverer can perform a verification process 204 of the delivery location 202 via the deliverer device 206. For instance, the delivery location 202 can include obscured identifying information 208 (e.g., obscured address information) that can prevent or hinder the verification process 204 by the deliverer. The deliverer device 206 can be configured to provide tracking information 210 for the deliverer within the delivery location 202 and delivery instructions 212. Accordingly, the deliverer device 206 can determine that the deliverer has arrived at a package placement location 214 and provide package placement information 216 that includes an approved drop-off location 218.

In some examples, the deliverer can arrive at the delivery location 202 and initiate a process for delivering a package to the correct delivery location associated by a customer. In particular, the deliverer arriving at the delivery location 202 can cause the process for delivering the package to be initiated substantially automatically or via manual action by the deliverer. For instance, the deliverer device 206 (e.g., deliverer devices 108) can be configured to track and/or report a location associated with the deliverer such that at least the deliverer device 206 can detect when the deliverer is within a threshold distance of the delivery location. Additionally, upon crossing the threshold distance, the deliverer device 206 can determine that identifying information associated with the delivery destination is to be presented to the deliverer via a user interface. The identifying information presented via the user interface can generally include a representation of the correct delivery location that enables the deliverer to determine, via comparison with the delivery location 202, whether the delivery location 202 is the correct delivery location for the package. Accordingly, the deliverer device 206 can substantially automatically identify when the deliverer has arrived at the delivery location 202 and cause the deliverer device 206 to present the verification process 204 and the identifying information for the correct delivery location of the package. Alternatively, or in addition, the deliverer device 206 can receive an indication that the deliverer has arrived at the delivery location 202 that causes the deliverer device 206 to initiate the verification process 204. In at least one example, the user interface can include a data field for the deliverer to provide an indication verifying the delivery location 202 is correct, requesting additional information due to the delivery location 202 being incorrect, to proceed to the next step of the delivery process, and/or otherwise requesting assistance. In at least one additional example, the user interface can be configured to present the identifying information for an amount of time before transitioning the user interface to display the delivery instructions 212 for locating the package placement location 214. It should be noted that, independent of how the delivery process is progressed, the deliverer can be given the option to view previously presented information upon request.

In some examples, the verification process 204 can be the first step of the delivery process that is initiated upon the deliverer arriving at the delivery location 202. In particular, the verification process 204 can be configured to enable the deliverer to determine whether the delivery location 202 is the correct delivery location for the package. More specifically, the verification process 204 can include presenting various identifying information associated with viewing the correct delivery location from the street and/or other likely vantage points (e.g., viewing the delivery location 202 from positions on a side walk, viewing the delivery location 202 from various approach paths where there are multiple sides of the correct delivery location that could be viewed, etc.) that the deliverer could view the correct delivery location from. Alternatively, or in addition, the verification process 204 can include highlighting identifying features of the correct delivery location that are likely to be visible to the deliverer upon approach to the correct delivery location. Accordingly, the deliverer is able to reference the provided information and compare the provided information with the delivery location 202. Additionally, identifying features, such as a shape of a building, position of significant landscaping features (e.g., fountains, shrubs, trees, rocks, walls, fences, boulders, etc.), decorations that are visible from the street (e.g., seasonal decorations, permanent fixtures, etc.), positions of architectural features (e.g., windows, doors, arches, pillars, awnings, overhangs, eaves, roofs, etc.), and other features can be viewed from multiple angles for identifying a delivery location 202 while standard identifying features (e.g., address numbers) are obscured from view (e.g., obscured identifying information 208).

In some additional examples, the verification process 204 can enable deliverer feedback where the identifying information presented via the deliverer device 206 was insufficient, lacked information (e.g., the customer has recently painted, the customer has recently removed one or more identifying features, etc.), and/or otherwise failed to substantially enable the identification of the delivery location 202 as the correct delivery location. For instance, the deliverer can flag the identifying information received from the customer to request additional clarification from the customer for future deliveries. Alternatively, or in addition, flagging the identifying information can provide a notification to the customer and cause the customer to submit supplementary information for the delivery and/or future deliveries. Additionally, the deliverer can utilize the deliverer device 206 to capture supplementary identifying information that may have changed since the identifying information was provided (e.g., house has been repainted, remodeled, etc.) for future deliveries to the delivery location 202.

In some examples, the deliverer device 206 can be configured to track the deliverer within the delivery location 202, to report tracking information 210 from within the delivery location 202, and/or to provide delivery instructions 212 for the delivery location 202. In particular, once the verification process 204 has concluded (e.g., delivery location 202 has been verified, deliverer has provided an indication, an amount of time has elapsed since the verification process 204 was presented via deliverer device 206, etc.), the deliverer device 206 can be configured to provide delivery instructions 212 that direct the deliverer to the package placement location 214. Additionally, the deliverer device 206 can be configured to track the deliverer relative to the position of one or more geofences that are utilized to determine, at least in part, the delivery location information (e.g., the verification process 204, the delivery instructions 212, and/or the package placement information 216) that is presented to the deliverer via the deliverer device 206. Accordingly, the deliverer can be guided through the delivery location 202 via a combination of updated delivery location information presented at least in part on the tracking information 210 collected by the deliverer device 206 and the delivery location information displayed by the deliverer device 206 being tailored to the proximity of the deliverer to the package placement location 214.

In some examples, the deliverer device 206 can be configured to present package placement information 216 to the deliverer upon determining that the deliverer is within the package placement location 214 and/or a threshold distance of the package placement location 214. For instance, the package placement information 216 can include a detailed depiction of a portion of the delivery location 202 that includes the approved drop-off location 218, an audible description that species the approved drop-off location 218, and/or other delivery location information that informs the deliverer of where the package is to be placed at the delivery location 202. Additionally, the delivery location information presented via the deliverer device 206 can be modified to present the delivery location information relevant to the package placement location 214. For example, where the package is to be placed behind a fence associated with the delivery location 202, the delivery location information can be modified to display the portion of the delivery location 202 that includes the fence while omitting other portions of the delivery location 202 such as a front porch, a driveway, a front lawn, and other locations that unassociated with the fence where the package is to be placed. Further, the delivery location information can be modified to include an indicator of the approved drop-off location 218 for the package. The indicator of the approved drop-off location 218 can be added by the customer during placement of the delivery order and/or by an analysis environment associated with the delivery that identifies the approved drop-off location 218 based on customer provided information, delivery confirmation information, and/or other information that indicates a customer preference for the placement of packages. The customer provided information can be provided via a user device associated with a customer, a custom profile that stores customer preferences, and/or other indications received from the customer.

In at least one example, the deliverer can provide delivery confirmation information associated with the delivery of the package. In particular, and after the package has been placed at the approved drop-off location 218, the deliverer device 206 can prompt the deliverer to confirm placement of the package via an image and/or other record of the package at the approved drop-off location 218. Additionally, the delivery confirmation information can be configured to include additional confirmation that the package was delivered to the correct delivery location for the customer though an additional image and/or other record of the address information 220. For example, where the address information 220 is unavailable during the verification process 204 of the delivery location 202 (e.g., obscured identifying information 208). Accordingly, the deliverer device 206 can cause the deliverer to capture delivery confirmation information that verifies the address information 220 and/or other previously obscured identifying information 208.

Figure 3:
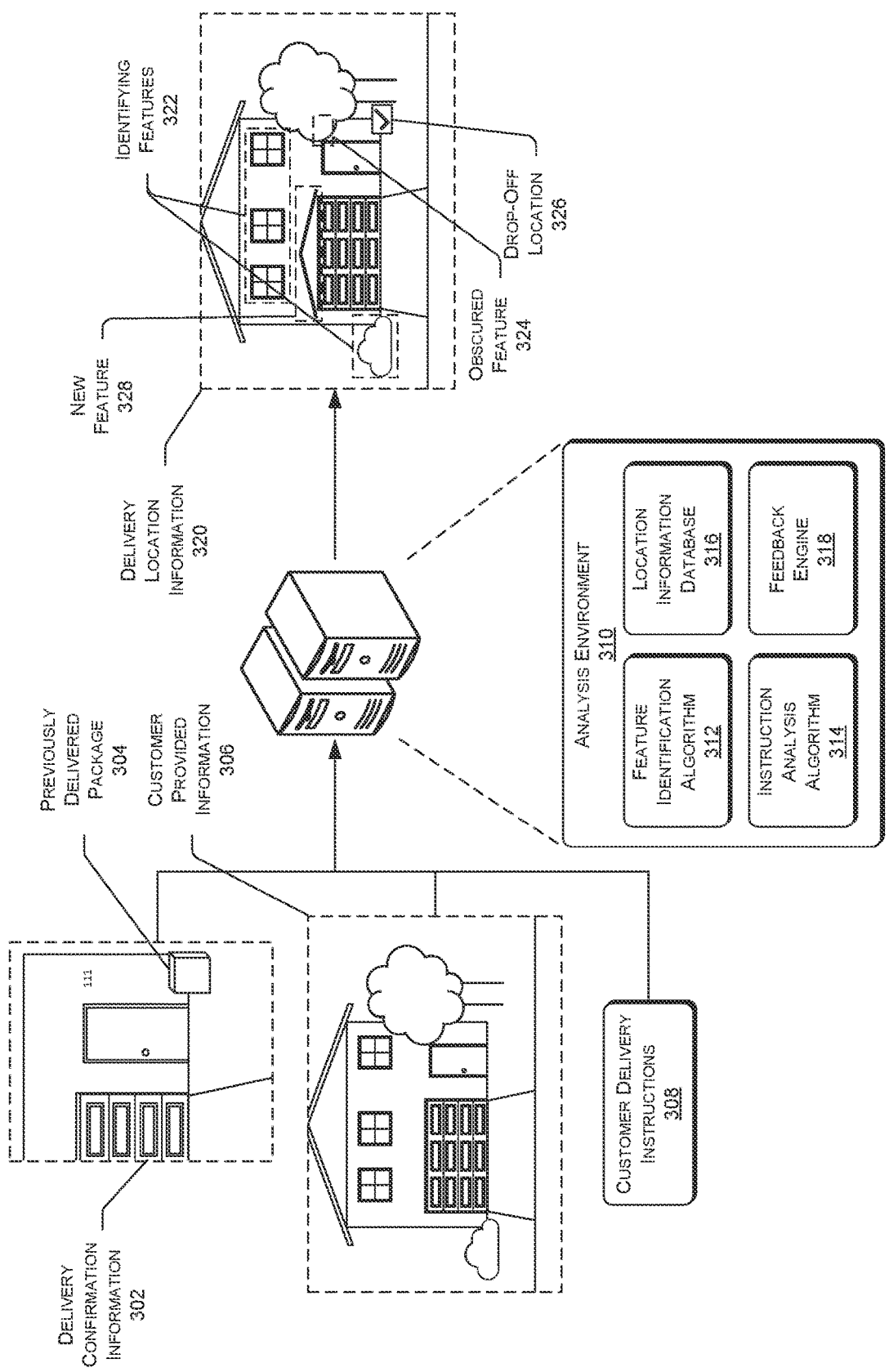
FIG. 3 illustrates an example analysis environment for generating delivery location information from customer provided information and previous delivery information that enables deliverer identification of a delivery location and a package placement location.

FIG. 3 illustrates an example analysis environment for generating delivery location information from customer provided information and previous delivery information that enables deliverer identification of a delivery location and a package placement location. In particular, previous delivery confirmation information 302 associated with previously delivered packages 304, customer provided information 306, and customer delivery instructions 308 can be received by an analysis environment 310. Additionally, the analysis environment 310 can utilize a feature identification algorithm 312 and an instruction analysis algorithm 314 to analyze the received information, store the identified features of the received information, and associate the received information with any feedback generated by a feedback engine 318. Further, the analysis environment 310 can be utilized to generate delivery location information 320 that includes indications of identifying feature(s) 322, obscured feature(s) 324, drop-off locations 326, and/or new features 328 within the received information. Accordingly, can generate the delivery location information 320 from various sources of information to enable a deliverer to deliver a package to a delivery location. It should be noted that the analysis environment 310 can be provided by a service entity that either provides delivery services for customer goods provided by the service entity or provides logistical services for delivery of goods from a third-party manufacturer to the customer.

In some examples, a camera, a sensor, or other recording component of a deliverer device can generate data that includes the delivery confirmation information 302, delivery location updates provided by deliverers at the delivery location, and/or other recordings of the delivery location. In particular, the delivery confirmation information 302 can depict and/or describe a delivery location that the deliverer has arrived at based on navigation instructions before or after a package has been placed at the delivery location for confirmation of the delivery. While the generated data commonly includes the previously delivered package 304, some example may include a general depiction of the delivery location (e.g., a delivery box provided by the customer to protect the package from the weather with the package placed inside). Accordingly, the delivery confirmation information 302 can be provided by a previous deliverer to confirm delivery of the previous package and verify placement of the previous package in an approved drop-off location at the delivery location.

In some examples, and similar to the example described above for the delivery confirmation information 302, a customer can utilize a camera, a sensor, or other recording component of a customer device to generate data that includes the customer provided information 306 associated with the delivery location. In particular, the customer provided information 306 can be provided by the customer associated with the delivery location to provide images and/or other recordings related to the delivery location to guide deliverers attempting to deliver packages to the delivery location. Additionally, the customer provided information 306 can depict and/or describe the delivery location, significant features of the delivery location, and/or a street view of the delivery location for the deliverer. While the generated data can include a package placement location, the customer can elect to provide multiple pieces of information to ensure proper delivery of packages. Accordingly, the customer provided information 306 can be provided in association with a previous or a current delivery to enable the deliverer and/or future deliverers to place the package at an approved drop-off location.

In some additional examples, the customer delivery instructions 308 can be provided by the customer as supplementary information to the customer provided information 306 or as delivery information supplied in place of the customer provided information 306. In particular, the customer delivery instructions 308 can be a set of steps that are constructed to cause the deliverer to navigate from a point of arrival (e.g., the point that navigation information leads the deliverer to) to the approved drop-off location. Additionally, the customer delivery instructions 308 can provide additional detail that may cover aspects of navigating between the point of arrival and the approved drop-off location that are absent or minorly featured in the customer provided information 306. Accordingly, the customer may provide customer delivery instructions 308 that grant additional guidance for the deliverer while delivering the package to the customer.

In some examples, the analysis environment 310 can determine, based in part on a delivery order, a delivery location that is associated with the customer provided information 306 and/or the customer delivery instructions 308 (e.g., received information). Additionally, the analysis environment 310 can determine whether any delivery confirmation information 302 is associated with the delivery location identified by the delivery order. Further, the analysis environment 310 can utilized the feature identification algorithm 312 and the instruction analysis algorithm 314 to analyze the received information and utilize the received information to generate the delivery location information 320, In particular, the analysis environment 310 can identify unique features associated with one or more images of the delivery location to determine that the package is being delivered to the delivery location and verify that the delivery location is associated with the customer. For example, the unique features identified by the analysis environment 310 can include features of a structure within the delivery location (e.g., garage door markings, doorways, residence siding panels, brick coloring, brick patterns, barriers, fences, windows, landscaping (e.g., plants, trees, etc.), stairs, etc.). Additionally, the analysis environment 310 can determine the unique features of the delivery location based at least on a comparison of one or more additional images that have been previously associated with the delivery location and successful deliveries to the customer. The one or more additional images of the delivery location can be captured during previous deliveries to the delivery location, provided by the customer associated with the delivery location, obtained from a third party service that documents various delivery location, and/or otherwise be obtained and verified for the delivery location. Accordingly, the analysis environment 310 can identify and verify unique features that can be utilized in the identification of the delivery location by the deliverer.

In some examples, the received information can include the customer provided information 306, an indication of customer preference for one or more approved drop-off locations to be utilized for package delivery, the customer delivery instructions 308, and/or other information provided by the customer regarding delivery of the package. In particular, the received information can be captured in response to a prompt displayed on a user device associated with the customer during placement of a delivery order, in response to an indication that the customer will provide the received information (e.g., customer elects to provide the customer provided information 306, the customer delivery instructions 308, etc.), and/or an indication that the customer has previously provided the received in association with one or more previous orders. Similarly, the received information can be requested from the customer in response to deliverer feedback that the received information is incomplete and/or inaccurate, analysis of the received information indicating one or more issues that are to be resolved, and/or other determinations that cause a request for updated and/or corrected information from the customer.

In some examples, the analysis environment 310 can be configured to utilize one or more algorithms to parse the received information, including the delivery confirmation information 302, the customer provided information 306, the customer delivery instructions 308, and/or other information relevant to the deliver that is received by the analysis environment 310. It should be noted that the delivery confirmation information 302 can be associated with indications of one or more previously delivered packages 304 within the one or more images. Alternatively, or in addition, the analysis environment 310 can be configured to identify the previously delivered packages 304 and/or representations of packages included in the customer provided information 306. Additionally, the analysis environment 310 can be configured to determine identifying features 322 associated with the delivery location that are depicted by the received information and can be utilized to provide guidance to the deliverer during delivery. For instance, the identifying features 322 of the delivery location can include structural features of the customer residence, patterns/designs associated with a garage door or a doorway, brick patterns associated with a structure or a sidewalk, landscaping features, fences, barriers, and other features included in the received information.

In at least one example, the identifying features 322 of the delivery location can be identified by the analysis environment 310 based at least on a plurality of images that have been previously evaluated for a plurality of delivery locations. The analysis environment 310 can be configured identify a set of the identifying features 322 within the received information for the delivery location that can enable the deliverer to correctly identify the delivery location. For example, the set of identifying features 322 for the delivery location can include a fence surround the front porch (e.g., the identifying features 322 related to the fence can include slate spacing, coloration of the fence components, thickness of a handrail, height of the fence, etc.), landscaping features near the front porch, a brick wall of the residence that the front porch extends from, a doorway from the residence to the front porch, and other identifying features 322 that are associated with the delivery location. Accordingly, the analysis environment 310 can generate delivery location information 320 from the set of identifying features 322 that enable a deliverer to determine that the delivery location is associated with the customer that requested the package.

In some examples, the analysis environment 310 can generate delivery location information 320 for the deliverer. In particular, the analysis environment 310 can determine, based on the determination that the received information is associated with the delivery location, the delivery location information 320 that is configured to provide different aspects of the received information at different points in the delivery process. As noted above, the analysis environment 310 can configure the delivery location information 320 such that a first image from the customer provided information 306 is provided to the deliverer within a first geofence, that the customer delivery instructions 308 are provided to the deliverer within a second geofence, and that delivery confirmation information 302 associated with the placement of a previously delivered package 304 is provided to the deliverer within a third geofence. Additionally, the delivery location information 320 can be configured to cause a user interface of the deliverer device to display the delivery location information 320 to the deliverer via an augmented reality overlay, a marked image of the delivery location, an audio description of the delivery location to be emitted by one or more audio outputs (e.g., speakers) associated with the deliverer device, and/or other interfaces capable of providing instructions to the deliverer regarding the delivery location (e.g., haptic feedback devices). In at least one example, the delivery location information 320 can be configured to provide information to the deliverer regarding unsafe drop-off locations, rejected drop-off locations, and/or approved drop-off locations associated with the delivery location. In particular, the delivery location information 320 can be an indication that the current drop-off zone associated with the package has been rejected based on previous deliverer feedback associated with the rejected drop-off location, one or more instances of package loss after delivery confirmation by previous deliverer(s), and/or other indications that one or more packages were damaged and/or lost after delivery to the rejected drop-off location. Further, where a requested drop-off location for the package is rejected, unsafe, or otherwise unacceptable, the delivery location information 320 can include an indication of one or more approved drop-off locations and/or alternative drop-off locations associated with the delivery location.

In some examples, the analysis environment 310 can be configured to utilize a feature identification algorithm 312, an instruction analysis algorithm 314, and a location information database 316 to determine whether the delivery location to generate the delivery location information 320 utilized by the deliverer to determine whether the delivery location is associated with the customer that requested delivery of the package. The feature identification algorithm 312 can be trained to analyze images, videos, and/or other media types (e.g., audio, text, etc.) to identify identifying features 322 associated with an address/the delivery location for the package. Additionally, the feature identification algorithm 312 can be trained utilizing images of delivery locations that have been previously analyzed, graded, and/or associated with the delivery location for the package. In particular, the feature identification algorithm 312 can be trained to recognize identifying features 322 that are specific to the delivery location of the package and generate delivery location information 320 that includes and/or highlights the features that can be utilized by a deliverer to identify the delivery location and determine that the delivery location is associated with the customer. Further, the feature identification algorithm 312 can be trained to identify images features (e.g., landscaping elements, driveways, sidewalks, mailboxes, location addresses, etc.) that can be common to multiple delivery locations, but may be arranged in a unique configuration within and/or in association with the delivery location. For instance, the feature identification algorithm 312 can be trained to identify and generate a model of the delivery location that includes identified images features of the delivery location (driveways, walkways, lawns, porches, etc., and the distances between the different features).

It should be noted that, while the feature identification algorithm 312 and the instruction analysis algorithm 314 are commonly discussed independently of one another, the feature identification algorithm 312 and the instruction analysis algorithm 314 can be components of a single unified algorithm of the analysis environment 310. In particular, the feature identification algorithm 312 can be a feature identification algorithm model. Similarly, the instruction analysis algorithm 314 can be an instruction analysis algorithm model. Additionally, an algorithm utilized by the analysis environment 310 can comprise the instruction analysis algorithm (model) 314 and the feature identification algorithm (model) 312, wherein the algorithm utilized by the analysis environment 310 is tailored to the delivery location based on the incorporation of the feature identification algorithm 312. Accordingly, while the discussion of feature identification algorithms 312 and instruction analysis algorithms 314 may be specific to individual algorithms, both algorithms can be utilized as models by an algorithm specific to the delivery location.

In some examples, and as noted above, the feature identification algorithm 312 can be trained and utilized on a per-delivery location basis. Alternatively, or in addition, the feature identification algorithm 312 can be trained and utilized to identify features associated with a plurality of delivery location. Independent of the basis for training and utilization, the feature identification algorithm 312 can be trained from one or more images that have been associated with the delivery location (or delivery locations). In particular, the feature identification algorithm 312 can be trained based on one or more images obtained from at least the delivery confirmation information 302 and/or the customer provided information 306 of the delivery location (or deliver locations). The one or more images may be taken by previous deliverers (e.g., delivery confirmation information 302) upon arrival at the delivery location and/or after delivery of the package. Alternatively, or in addition, the one or more images can be provided customer(s) (e.g., customer provided information 306). Further, the one or more images can be evaluated to determine, in combination with any customer and/or deliverer feedback via the feedback engine 318, that the one or more images are captured at the delivery location associated with the customer that requested the package. For example, a previously delivered package 304 can be delivered to the delivery location for the customer, the deliverer can capture an image of the previously delivered package 304 at the delivery location, and a notification can be provided to the customer based on the delivery being completed. Where the customer provides a positive response or review to the notification, the image can be evaluated as an accurate image of the delivery location associated with the customer and stored as the delivery confirmation information 302 for future reference. Similarly, where the customer does not provide a response to the notification, the image can be evaluated as an accurate image of the delivery location for the package. However, where the customer provides a negative response or review of the delivery, the image can be evaluated as an inaccurate image of the delivery location. Additionally, the customer can be further prompted to provide additional feedback that indicates whether the package was placed in a rejected drop-off location, the package was placed at an incorrect delivery location (e.g., the delivery location where the package was placed is unassociated with the customer), and/or other delivery errors (e.g., package was damaged, package was stolen, etc.). Alternatively, or in addition, the negative response and/or review can be further evaluated to determine whether the delivery location of the previously delivered package 304 was an incorrect delivery location (e.g., package was placed at the wrong address or wrong delivery location) or an unsafe delivery location (e.g., the package was placed at the correct delivery location, but was stolen or taken before the customer could retrieve the package). Similarly, the images evaluated as accurate images of the delivery location can be associated with safe (or safer) drop-off locations. The one or more images (accurate and/or inaccurate) can be stored in association with the delivery location and the customer, after evaluation, in the location information database 316 for further consideration and/or matching operations executed by the feature identification algorithm 312.

In some additional, or alternative, examples, the feature identification algorithm 312 can be trained based on one or more images from the customer provided information 306 associated with the delivery location. In particular, the customer can provide one or more images that include approved drop-off location(s), preferred drop-off locations, unsafe drop-off locations, do not deliver locations, and other locations within the delivery location associated with the customer. Additionally, the customer can provide indications and/or tags for the one or more images identifying whether packages can be delivered to the drop-off location(s) depicted by the one or more images. Further, the customer can provide indications of package types that are to be placed at a drop-off location such that different package types are placed at different drop-off locations. Accordingly, the customer provided information 306 can be evaluated, associated with indications of approved drop-off locations and restricted drop-off locations within the delivery location, and stored in the location information database 316 for utilization by the feature identification algorithm 312. Further, the feature identification algorithm 312 can be trained based on the customer provided information 306 to determine that the delivery location a deliverer has arrived at is the associated with the customer that requested the package based on information recorded by the deliverer device. In at least one example, the deliverer can provide feedback, via the feedback engine 318, that prioritizes a set of the customer provided information 306 for utilization by future deliveries to the delivery location.

In some examples, the instruction analysis algorithm 314 can be trained based on the customer delivery instruction 308 stored by the location information database 316. In particular, the customer delivery instructions 308 can be utilized to train the instruction analysis algorithm 314 to identify keywords within the customer delivery instructions 308. Additionally, the instruction analysis algorithm 314 can be trained based on the delivery confirmation information 302 and/or the customer provided information 306 that is associated with one or more delivery locations. More specifically, the instruction analysis algorithm 314 can be trained to associate the keywords identified from the customer delivery instructions 308 with the features identified, optionally by the feature identification algorithm 312, from the delivery confirmation information 302 and the customer provided information 306. The keywords identified can be further associated with areas and/or zones of the delivery location, generic features of the delivery location, and other indicators that may be utilized in generating associations between the keywords and the features associated with the delivery location. As noted above, a customer can provide indications of approved drop-off locations and rejection drop-off locations within the delivery location. From the customer provided information 306 and the customer delivery instructions 308, the instruction analysis algorithm 314 can be configured to determine identifying information that is to be presented to the deliverer to enable identification of the delivery location as associated with the customer and verification that the package is to be placed at the delivery location.

In some examples, the analysis environment 310 can be configured to present delivery location information 320 that is augmented and/or annotated with additional information and/or indications related to the delivery location for the package. In particular, the analysis environment 310 can be configured to identify changes within the delivery location that can be presented to the deliverer during delivery. Similarly, the analysis environment 310 can be configured to highlight identifying features 322, obscured features 324, and/or approved drop-off locations 326 within the delivery location information 320 provided to the deliverer at different points in the delivery process. Alternatively, or in addition, the identification of differences between the customer provided information 306, the customer delivery instructions 308, and/or the delivery confirmation information 302 can result in a notification being provided to the customer for updated customer provided information 306 and/or updated customer delivery instructions 308. For example, where delivery confirmation information 302 indicates that the delivery location associated with the customer has undergone a modification (e.g., was painted, remodeled, landscaped, driveway was paved, etc.) and the customer provided information 306 continues to indicate that the delivery location is associated with previously received identifying features 322, a notification can request the customer update the provided information while the delivery location information 320 is configured to indicate the changes that have occurred to future deliverers. As noted above, the analysis environment 310 can utilize the feature identification algorithm 312 and/or instruction analysis algorithm 314 to compare recently provided delivery confirmation information 302, customer provided information 306, and/or customer delivery instructions 308 data stored by the location information database 316 to indicate identifying features 322, obscured features 324, approved drop-off location(s) 326, and new features 328 associated with the delivery location of the package. It should be noted that the new features 328 can be identified based in inconsistencies between recently captured delivery confirmation information 302, currently captured images provided by the deliverer device, and previously provided customer information 306 (or customer delivery instructions 308). For example, upon arriving at the delivery location, the deliverer can capture an image of the delivery location that includes a garage awning that the analysis environment 310 determines is not in the customer provided information 306. Accordingly, the analysis environment 310 can be configured to highlight and/or otherwise indicate the discrepancy in the delivery location information 320.

In some examples, the analysis environment 310 can be configured to generate a user interface that is configured to update in substantially real-time based on images of the delivery location captured by the deliverer device upon arrival at the delivery location and as the deliverer navigates the delivery location. In particular, the analysis environment 310 can be configured to generate the user interface, such as an augmented reality overlay based on the features highlighted by the feature identification algorithm 312 and/or instruction analysis algorithm 314. As displayed by the delivery location information 320, different features can be highlighted for the deliverer (e.g., the identifying features 322, the obscured features 324, the approved drop-off locations 326, new feature 328) can be indicated by being highlighted, encircled, and/or otherwise associated with focus indicators (e.g., boxes, checkmarks, description tags, audible commands, audible indicators, etc.). Accordingly, the analysis environment 310 can be configured to present an augmented reality overlay to the deliverer via the delivery location information 320 that assists the deliverer in locating the identifying features 322 and determining whether the identifying features 322 indicate that the delivery location is associated with the customer and includes a package placement location for the package.

Accordingly, utilizing an analysis environment 310 to assist the deliverer in identifying the delivery location as associated with the customer that requested the package can improve customer satisfaction and operational efficiency associated with delivery operations of a service provider (e.g., an entity associated with causing the package to be delivered to the customer from a third-party merchant or from an internal merchant) associated with the analysis environment 310. In particular, providing the delivery location information 320 can improve chances of the package (or packages) being delivered to the delivery location such that the package is placed at an approved drop-off location 326 and will be received by the customer associated with the delivery location. Additionally, the delivery location information 320 can reduce the chances of the package (or packages) being lost, damage, or otherwise not properly received by the customer. The delivery location information 320 can improve deliverer completion of delivery orders, placed by the customer, by providing the deliverer with delivery location information 320 generated from at least one of delivery confirmation information 302, customer provided information 306, and/or customer delivery instructions 308. Providing the delivery location information 320 to enable deliverer identification of the delivery location and verifying that the delivery location is associated with the customer can improve the customer and the deliverer experience by ensuring that the deliverer can identify the delivery location even when standard identifying information, such as an address, is obscured or otherwise not available (e.g., it is nighttime and the address is not visible). Similarly, the delivery location information 320 can reduce logistics costs and project management resources consumed by individual delivery orders by reducing the number of delivery orders that cause intervention by the service provider to remedy lost packages, damaged delivery goods, and other issues that cause customer dissatisfaction with the service provider. Alternatively, or in addition, the delivery location information 320 can reduce financial and logistics resources consumed in reacquiring delivery goods from third parties in scenarios where a customer did not receive the package. Accordingly, the service provider can benefit from increased customer goodwill and reduced operational costs by providing deliverers the ability to identify the delivery location, guide the deliverers to a package placement location, and ensure that the package is placed in an approved drop-off location.

It should be noted that sets of identifying features 322 can be identified from a plurality of data points (e.g., images) associated with the delivery location to identify data point clusters (e.g., a set of images of the delivery location). Additionally, the data point clusters can be utilized by the feature identification algorithm 312 (or the instruction analysis algorithm 314) to efficiently identify the delivery location and verify that the delivery location is associated with the customer. The set of identifying features 322 can be utilized with additional sets of identifying features 322 as priority identifiers that reduce the number of data points associated with the delivery location that are to be compared with the device information collected from the delivery location. Accordingly, the set of identifying features 322 can form a cluster of data points that are shared identifying features 322 utilized as high priority identifiers that are presented to the deliverer to streamline the identification of the delivery location and the verification that the delivery location is associated with the customer by the deliverer.

Figure 4:
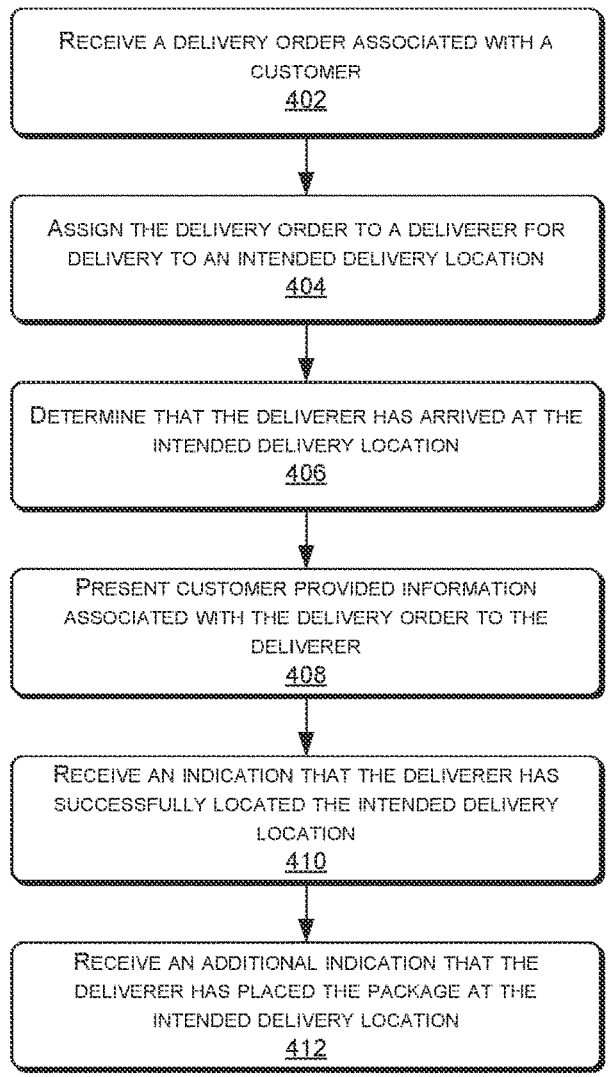
FIG. 4 illustrates an example flow diagram that describes a process for delivering a package after a deliverer has arrived at a delivery location and verifying that the delivery location is associated with a customer.

FIG. 4 illustrates an example flow diagram that describes a process for delivering a package after a deliverer has arrived at a delivery location and verifying that the delivery location is associated with a customer. It should be noted that the process described by FIG. 4 can be internal to a deliverer device or a remote coordination system in communication with the deliverer device via wireless and/or wired communications.

At block 402, a system can be configured to receive a delivery order from a customer for a package (e.g., a purchased item wrapped in a protective casing) to be delivered to a delivery location. In particular, the customer can transmit the delivery order to the system or a third-party service, manufacturer, and/or vendor can transmit the deliver order associated with the customer to the system. Additionally, the delivery order can be accompanied by customer provided information and/or customer delivery instructions. Alternatively, or in addition, the customer can be prompted during submission of the delivery order to submit the customer provided information and/or the customer delivery instructions to aid in delivery of the package to the delivery location. Further, the delivery location associated with the customer can be further associated with one or more indications that previous deliverers have had issues identifying the delivery location and/or verifying that the delivery location is associated with the customer (e.g., the delivery location is a correct delivery location for the customer). Accordingly, the customer provided information and/or the customer delivery instructions can be configured to assist deliverers in identifying the delivery location upon arrival and verifying that the delivery location is associated with the customer.

At block 404, the system can be configured to assign the delivery order to a deliverer for delivery to the delivery location. As noted above, the system can be associated with a plurality of deliverers that are available to deliver packages to customers. In particular, the deliverer can request assignment to one or more delivery orders and/or indicate availability to deliver one or more delivery orders during an amount of time. Alternatively, or in addition, the deliverer can receive an indication from the system that they have been assigned to deliver the one or more delivery orders. Accordingly, the deliverer can report to a delivery center or other facility associated with the system to receive one or more packages associated with the one or more delivery orders and delivery location information associated with the one or more delivery orders on a deliverer device associated with the deliverer.

At block 406, the system can determine that the deliverer has arrived at the delivery location for a package associated with the delivery order. In particular, the delivery location can be associated with a distance threshold that defines a geofence and/or an area boundary that can indicate that the deliverer has arrived at the delivery location. However, in some examples, the geofence and/or the area boundary can encompass multiple potential delivery locations and/or an amount of area that the delivery location is associated with, but not viewable from. For example, the geofence can include a plurality of residences (e.g., houses, apartments, condominiums, etc.), a property with an extended driveway and landscape that obscures the delivery location, obscured address information, and/or other features that make it difficult for a deliverer to determine whether the deliverer has arrived at the delivery location. Accordingly, the geofence and/or the area boundary can be established to define an area that includes the delivery location and one or more identifying features associated with the delivery location that are viewable upon arrival to the vicinity of the delivery location. In at least one example, the system can receive indications of deliverer location via a global position system (GPS) that indicate the deliverer device is within the distance threshold of the delivery location, that a wireless fingerprint associated with the delivery location is detected by the deliverer device, that the deliverer device provides an image that includes identifying features associated with the delivery location, and/or other indications that the deliverer has arrived at the delivery location.

At block 408, the system can present the customer provided information associated with the delivery order to the deliverer. In particular, the system can be configured to generate delivery location information from a variety of information sources, including customer provided information (e.g., audio, images, video, and other media files that depict or describe identifying features of the delivery location), customer delivery instructions, delivery confirmation information associated with previous deliveries to the delivery location, and/or location information from third-party sources (e.g., real-estate databases, navigation services, mapping services, etc.) associated with the delivery location. Additionally, and as noted above with reference to FIG. 3, the system can be associated with one or more algorithms configured to analyze the information sources to generate the delivery location information. Further, the delivery location information can include indications of identifying features, a package placement location, approved drop-off locations, and other points of interest associated with the delivery location. Accordingly, the delivery location information can be generated to assist the deliverer in determining whether the deliverer has arrived at the delivery location.

At blocks 410 and 412, the deliverer can transmit a first indication that the deliverer has successfully located the delivery location and a second indication that the deliverer has placed the package at the delivery location. In particular, the delivery location information can be configured to assist in identifying the delivery location, verifying that the delivery location is associated with the customer, and placing the package at a package placement location and/or an approved drop-off location. Additionally, the delivery location information can include additional information related to navigating the delivery location, such as navigating an apartment complex, delivering a package to a specific door on a residence, navigating an office building to reach a mail room, and/or other delivery instructions provided by the customer and/or previous deliverers for navigating the delivery location. Further, the indications provided by the deliverer can trigger the system to present additional delivery location information (e.g., in response to the first indication, the system transmits customer delivery instructions for locating an approved drop-off location), request delivery confirmation (e.g., cause the deliverer to capture an image of the package at the approved drop-off location), and/or provide feedback associated with the delivery location instructions and/or the delivery location (e.g., delivery location instructions indicated the wrong building color for the delivery location, the delivery location now includes a new front porch, etc.).

Figure 5:
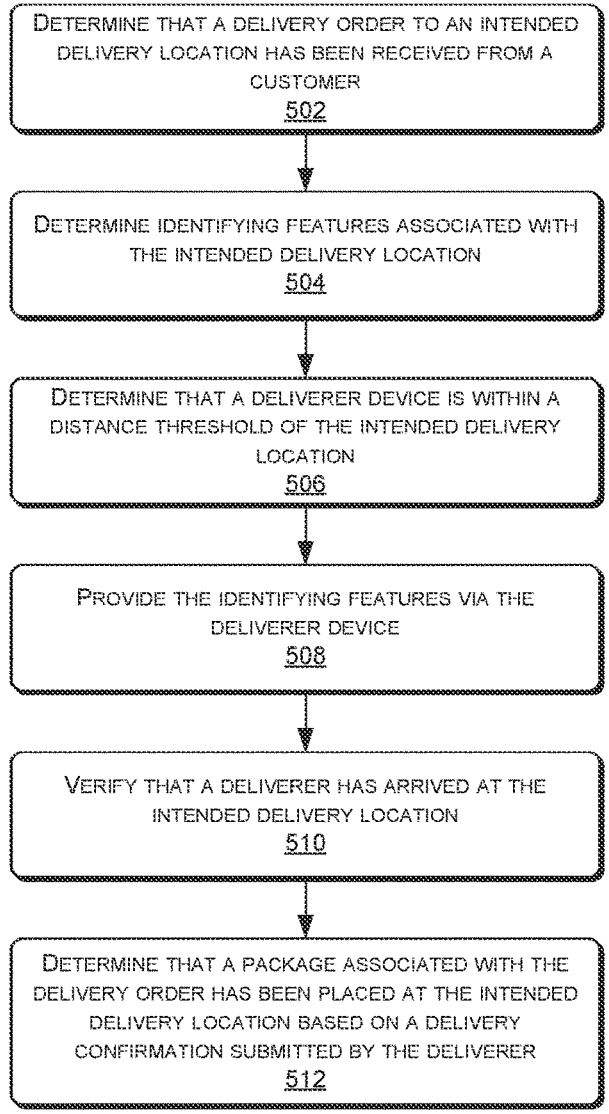
FIG. 5 illustrates an example flow diagram that describes delivery of a package to an approved drop-off location requested by a customer and verification that the package was delivered to a delivery location associated with the customer.

FIG. 5 illustrates an example flow diagram that describes delivery of a package to an approved drop-off location requested by a customer and verification that the package was delivered to a delivery location associated with the customer. It should be noted that the process described by FIG. 5 can be internal to a deliverer device or a remote device in communication with the user device via wireless and/or wired communications. In particular, the remote device can communicate with the deliverer device to coordinate delivery of the package to the delivery location. For example, a GPS signal, WiFi fingerprinting, network locations, or other indications of deliverer device location may be provided to the remote device for coordination of package delivery to a package placement location and for determining whether the deliverer has arrived at the delivery location.

At block 502, the remote device can be configured to determine that a delivery order to a delivery location has been received from a customer. Alternatively, or in addition, the deliverer device can determine that the delivery order for the package has been placed based at least on an assignment of the deliverer device to the package and the delivery location by a delivery coordination system. Additionally, the delivery order can include and/or be associated with an image of identifying features for the delivery location.

At block 504, the remote device (or the deliverer device) can be configured to determine identifying features associated with the delivery location. In particular, identifying features of the delivery location can be identified and/or extracted from an image of the delivery location. For instance, the customer associated with the delivery location can provide an indication of the identifying features that can be utilized to identify the delivery location and verify that the delivery location is associated with the customer and a package placement location for the package. The indications can be a focus indicator on an image (e.g., a box, highlight, an icon, an arrow, etc.), a description of the identifying features within the image (e.g., customer provided images are accompanied by delivery instructions that indicate that the delivery location is a blue house with white trim that has a rock wall between the house and a sidewalk), and/or other indicators of the identifying features associated with the delivery location. Accordingly, the customer can provide an image and/or other media that includes the identifying features that enable the deliverer to identify the delivery location and verify that the delivery location is associated with the customer where standard identifiers (e.g., address numbers, mailbox number, etc.) are obscured.

In some additional examples, the remote device can be configured to utilize a plurality of previously identified features associated with the delivery location to determine whether customer provided information depicts the identifying features of the delivery location. In particular, the remote device can determine the plurality previously identified features based at least on information (e.g., customer provided information, deliverer confirmation information, etc.) associated with one or more previous deliveries to the delivery location. Additionally, the remote device can utilize the plurality of previously identified features to analyze the image (or other customer provided information) and determine whether the image depicts the identifying features associated with the delivery location. Further, the remote device can generate a similarity score for the image based at least in part on a comparison of the identifying features and the plurality of previously identified features. For instance, the remote device can utilize computer vision techniques to compare the image and the plurality of identifying features associated with the delivery location to determine whether the image includes a set of identifying features selected from the plurality of identifying features. More specifically, the plurality of identifying features can be associated with past deliveries to the delivery location and can include past images and/or other media captured from various positions within the delivery location. Accordingly, the plurality of identifying features can include individual features that are not commonly viewable, are partially perceivable, are difficult to view, and/or are otherwise low-quality identifying features when viewed from the various positions. In light of the plurality of identifying features, the image can be compared with at least the set of identifying features. Additionally, the remote device can determine that the image is not associated with the delivery location based at least on the similarity score falling below a similarity score threshold. Alternatively, the remote device can determine that the identifying features are associated with the delivery location where the similarity score satisfies the similarity score threshold. Further, where the similarity score fails to satisfy the similarity score threshold, the customer (or deliverer) can be prompted to capture an additional image and/or to relocate to the delivery location such that the additional image includes the set of identifying features.

In some further examples, the remote device can utilize a machine learning algorithm to analyze the customer provided information to determine the identifying features of the delivery location. In particular, the machine learning algorithm can be trained, based at least in part on a plurality of images associated with the delivery location, to analyze the image and identify the identifying features for presentation via the deliverer device. For instance, the machine learning algorithm can be configured to receive customer delivery instructions, identify keywords from the customer delivery instructions, and associate the keywords with the delivery location. Additionally, the machine learning algorithm can utilize the keywords in combination with at least one of delivery confirmation images or customer provided images to determine the identifying features associated with the keywords within the customer provided information (e.g., images of the delivery location provided by the customer). Alternatively, or in addition, the machine learning algorithm can be trained to receive the customer provided information and extract the identifying features associated with the delivery location based at least in part on a dataset comprised of a plurality of identifying features associated with previous deliveries to the delivery location. The dataset can include previously submitted images and information associated with the delivery location that have been analyzed (e.g., manually, by a computer vision system, via an image processing system, etc.) and graded (e.g., annotated with identifying tags for the features within the images). Accordingly, the dataset can be utilized to train the machine learning algorithm such that the machine learning algorithm can identify identifying features within the customer provided information.

At block 506, the remote device (or the deliverer device) can be configured to determine that the deliverer device is within a distance threshold of the delivery location based at least in part on a position of a deliverer device. In particular, and as noted above, one or more distance thresholds can be configured as geofences that are associated with the delivery location. The geofences and/or distance thresholds can be configured based at least on customer indications, previous deliveries to the delivery location, third-party databases, and/or other geolocation information associated with the delivery location. Additionally, the geofences can be determined for various distances from the approved drop off location and/or the preferred drop-off location at the delivery location. As noted above, the delivery location be associated with a far geofence (e.g., geofence associated with the distance threshold that navigation information can place the deliverer within), a middle geofence (e.g., geofence associated with the delivery instructions), and a near geofence (e.g., geofence associated with the package placement location). Accordingly, the remote device can determine whether the deliverer device is within the geofence(s). Alternatively, the remote device can configure the delivery location information provided to the deliverer device such that as the deliverer device crosses a geofence, addition information can be provided to the deliverer.

At block 508, the remote device (or the deliverer device) can be configured to provide the identifying features via the deliverer device. For instance, upon determining that the deliverer has arrived at a delivery location within a distance threshold of the delivery location, the remote device can cause the identifying features and/or the image provided by the customer (e.g., customer provided information) to be provided via the deliverer device.

In some additional examples, the remote device can cause (or the deliverer device can determine that) the image of the delivery location to be displayed via the deliverer device. In particular, the remote device can receive one or more indications of a position associated with the deliverer device and determine that the position of the deliverer device indicates that the deliverer device is within a distance threshold associated with the delivery location. Further, and based at least on the deliverer device being within the distance threshold, the remote device can cause the image of the delivery location to be provided for identification and verification of the delivery location. For instance, the image of the delivery location can enable the deliverer to confirm that the deliverer has arrived at the delivery location associated with the customer. Additionally, the deliverer can request additional instructions where the deliverer (or the deliverer device) determines that the deliverer has arrived at an incorrect delivery location to cause the deliverer to correctly identify the delivery location for delivery of the package. In addition to the distance threshold, the delivery location can be associated with an additional distance threshold. The remote device can determine that the deliverer device is within the additional distance threshold and cause delivery instructions for placing the package at a package placement location to be provided to the deliverer.

At block 510, the remote device (or the deliverer device) can be configured to verify that the deliverer has arrived at the delivery location. In particular, the remote device can request confirmation that the customer provided information has caused the deliverer to identify the delivery location and verified that the delivery location is associated with the customer. More specifically, the remote device can request deliverer confirmation that the delivery location includes a package placement location for the package.

At block 512, the remote device (or the deliverer device) can be configured to determine that the package has been placed at the delivery location based on a delivery confirmation submitted by the deliverer. In particular, and based on at least in part on the delivery confirmation received from the deliverer device, the remote device can determine that the package has been placed at an approved drop-off location and/or a package placement location at the delivery location. In some further examples, the package placement location can be a portion of the delivery location, identified by a geofence and/or other positional boundary, that customer has requested the package be delivered to. In particular, upon receiving confirmation that the delivery location has been identified and verified as associated with the customer, the deliverer device can direct the deliverer to a package placement location within the delivery location. Additionally, the package placement location can include indications of approved drop-off location(s), rejected drop-off location(s), and/or other indications that enable the deliverer to complete delivery of the package and minimize potential delivery issues (e.g., package damage, package theft, customer dissatisfaction/frustration, etc.).

In some additional examples, the remote device can receive an indication from the deliverer device that requests updated customer provided information for the delivery location. In particular, the deliverer can determine that the identifying features are no longer associated with the delivery location, have been modified since the customer provided the customer provided information, and/or since the previous deliverer submitted the delivery confirmation information. Accordingly, the deliverer can request the updated image of the delivery location, wherein the request indicates that the image and the identifying features are inaccurate for the delivery location. Further, a notification can be transmitted to the customer that indicates that the updated image is requested for future deliveries to the delivery location.

Figure 6:
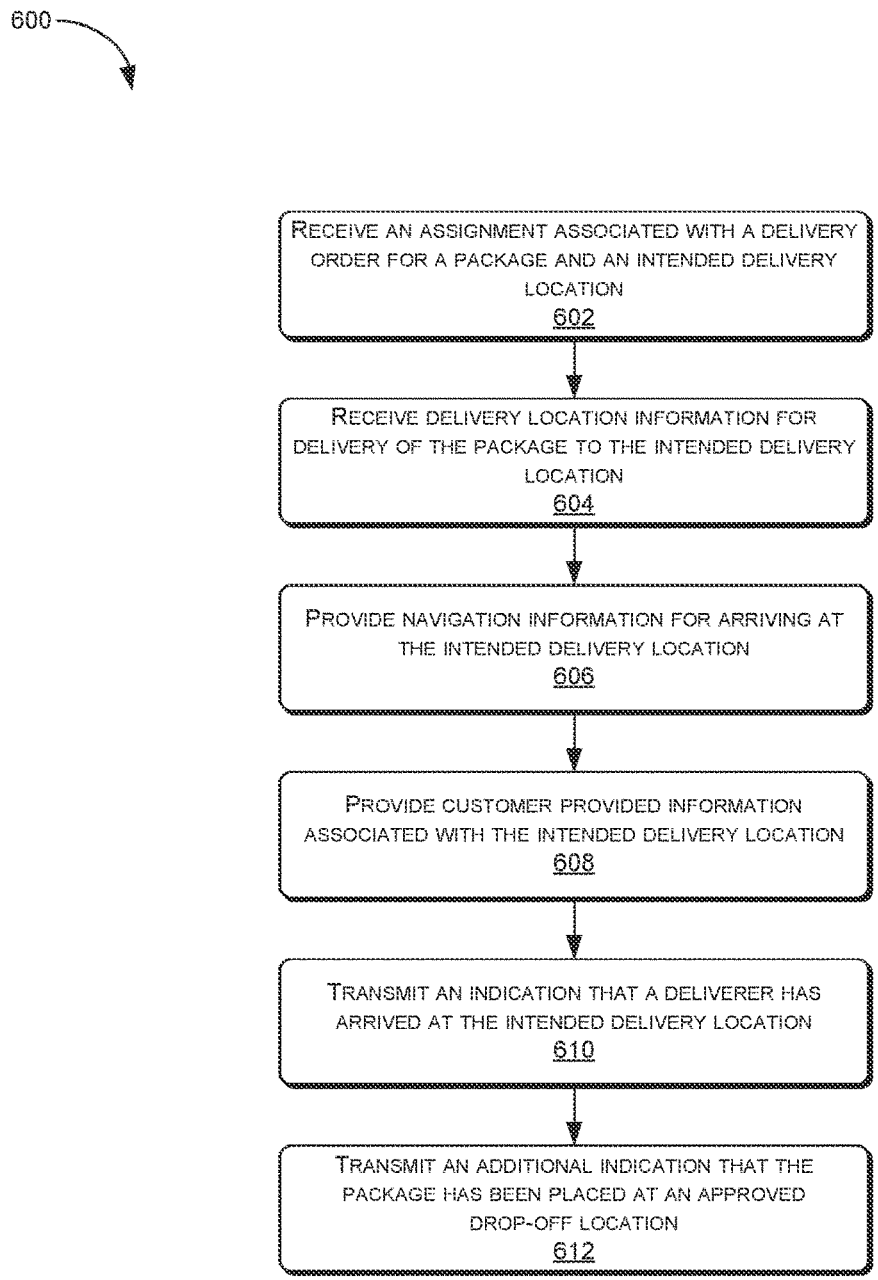
FIG. 6 illustrates an example flow diagram that describes a method coordinating communications between a delivery coordination system and a deliverer device to deliver a package to a delivery location requested by a customer.

FIG. 6 illustrates an example flow diagram that describes a method coordinating communications between a delivery coordination system and a deliverer device to deliver a package to a delivery location requested by a customer.

At block 602, a deliverer device can receive an assignment associated with a delivery order for a package and a delivery location. In particular, the deliverer device can be configured to receive the assignment instructing the deliverer to complete the delivery order submitted by a customer. Additionally, the deliverer device can receive the assignment for a timeslot indicated by a previous communication between the deliverer device and the delivery coordination system (e.g., deliverer availability communications), a schedule of the deliverer associated with the deliverer device, and/or other indications of deliverer availability. Further, the assignment can include a plurality of delivery orders that are to be completed via the delivery device.

At block 604, the deliverer device can receive delivery location information configured to enable delivery of the package to the delivery location. In particular, upon receiving the assignment to complete the delivery order, the deliverer device can be utilized to scan one or more packages associated with the order and receive the delivery location information associated with the delivery location. Additionally, the delivery location information can include navigation information for directing the deliverer to the delivery location, for displaying one or more images and/or other media submitted by the customer (or other deliverers) to identify the delivery location and verify that the delivery location is associated with the customer, and for identifying an approved drop-off location and/or package placement location for the one or more packages at the delivery location. The delivery location information can include geofences, distance thresholds, and other position related indicators that cause the deliverer device to present a subset of the delivery location information to the deliverer. Further, the delivery location information can include image processing algorithms that have been trained and/or configured to compare one or more images captured by the deliverer device at a delivery location, compare the one or more images with customer provided images and/or identifying features of the delivery location, and determine whether the delivery location is associated with the customer for the deliverer.

At block 606, the deliverer device can provide navigation information that causes the deliverer to arrive at the delivery location. In particular, the navigation information can be generated from GPS positioning associated with the deliverer device, on device location tracking services, route information between the delivery center, a previous delivery location, and/or the delivery location, and other information for directing the deliverer to the delivery location. It should be noted that the navigation information can be generated and transmitted to the deliverer device from a remote server and/or generated by the deliverer device. Accordingly, the deliverer device can be configured to provide the navigation information independent of whether the deliverer device has an active network connection.

At block 608, the deliverer device can provide the customer provided information associated with the delivery location to enable identification of the delivery location, verification that the delivery location is associated with the customer, and/or enable determination that the deliverer is to be relocated from an incorrect delivery location (e.g., a delivery location that is unassociated with the customer) to the delivery location associated with the customer. As noted above, the delivery location information can include an image and/or other media provided by the customer that enables the deliverer to identify and verify the delivery location. Additionally, upon determining that the deliverer has arrived at the delivery location (e.g., deliverer has crossed a first geofence boundary associated with the deliver location), the deliverer device can present the customer provided information for reference by the deliverer. For instance, the deliverer device can provide a street-view image of the deliver location such that the deliverer can reference the street-view image and identify the delivery location. Further, the deliverer device can provide the delivery location information that was received upon scanning of the one or more packages at a delivery center, was received in response to an indication that the deliverer has arrived at the delivery location, and/or in response to a transmission to a delivery coordination system that the deliverer has arrived at the delivery location.

At block 610, the deliverer device can transmit an indication that the deliverer has arrived at the delivery location. In particular, the indication can confirm that the deliverer has identified the delivery location and verified that the delivery location is associated with the customer and the one or more packages. Additionally, transmission of the indication can enable the deliverer device to present additional customer provided information and/or delivery instructions (e.g., customer has provided audio instructions for navigating the delivery location). For example, upon transmitting the indication to the delivery coordination system, the deliverer device can be prompted to provide the additional customer provided information, can receive the additional customer provided information from the delivery coordination system, and/or otherwise cause the deliverer to proceed with delivering the one or more packages.

At block 612, the deliverer device can transmit an additional indication that the package has been placed at an approved drop-off location. In particular, the deliverer device can prompt the deliverer to confirm placement of the one or more packages at the approved drop-off location. Additionally, the deliverer device can prompt the deliverer to capture an image of the delivered packages at the approved drop-off location to confirm successful delivery. Further, the confirmation image can be utilized by future deliveries for identification of the delivery location and/or the approved drop-off location. In at least one embodiment, the addition indication can include images of the one or more packages placed at multiple approved drop-off locations based at least on a customer indication that different classes of packages are to be delivered to different approved drop-off locations. Accordingly, the deliverer device can indicate completion of the delivery order for the delivery location.

Figure 7:
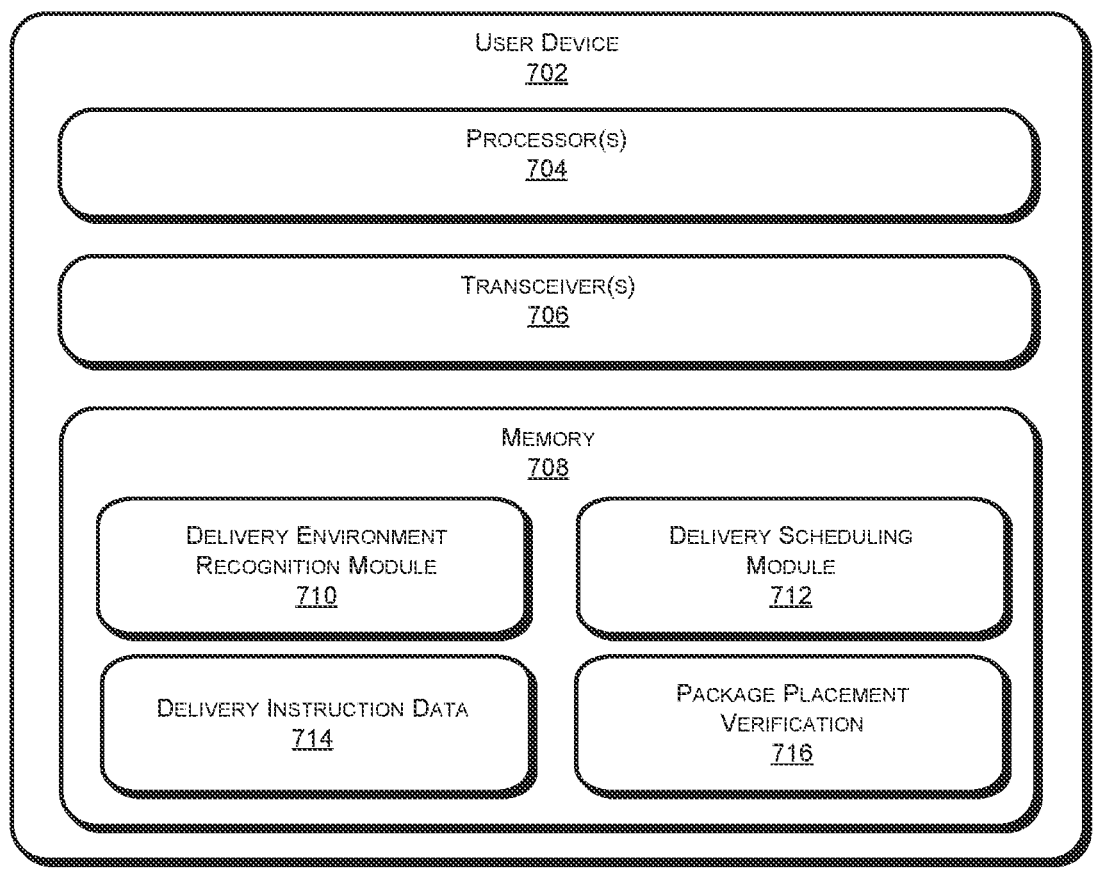
FIG. 7 illustrates a block diagram of a user device configured to determine whether a package has been placed at a delivery location for a customer and verifies that the package has been appropriately placed at the delivery location.

FIG. 7 illustrates a block diagram of a user device configured to determine whether a package has been placed at a delivery location for a customer and verifies that the package has been appropriately placed at the delivery location. In some examples, system 702 can interact with or correspond to any of the systems and/or implement the methods discussed in FIGS. 1-6. As illustrated, system 702 is generally comprised of one or more processors 704, one or more transceivers 706, and memory 708.

In some examples, the one or more processors 704 can include one or more central processing units (CPUs), one or more graphics processing units (GPUs), both CPUs and GPUs, or other processing units or components known in the art. For example, the one or more processors can include one or more processing units configured as controllers, microcontrollers, computational devices, microprocessors, and/or other computational devices configured to control and/or cause a user device to execute the operations described above.

In some examples, the one or more transceivers 706 can include one or more wired or wireless transceivers. For instance, the transceivers 706 can include a network interface card, a network adapter, a LAN adapter, an address associated with a network connection, or another device permitting communications to be sent and received. Additionally, the one or more transceivers 706 can comprise any wireless transceiver capable of engaging in wireless, radio frequency (RF) communication. Further, the one or more transceivers 706 can also include other wireless modems, such as Wi-Fi, WiMAX, Bluetooth, and/or infrared communication modems. Accordingly, the one or more transceivers 706 can be configured to transmit customer provided information, deliverer feedback reports, images, confirmation, deliverer positions, and addition information relevant to identifying potential delivery locations as a delivery location.

In some examples, memory 708 can be volatile (such as RAM), non-volatile (such as ROM, flash memory, etc.) or some combination of the two. The memory 708 may include removable storage, non-removable storage, and other forms of computer-readable media including, but not limited to RAM, ROM, EEPROM, flash memory, other memory technologies, CD-ROM, DVDs, content-addressable memory (CAM), other optical storage, magnet storage, and any other medium which can be used to store the desired information in a format that the system 702 accesses during execution of the above methods and/or operation of the above systems. The memory 708 can comprise one or more modules that cause the processors to execute one or more instructions and perform the operations discussed above with respect to FIGS. 1-6. Further, the memory 708 can comprise additional modules that can be executed by the processors 704 and cause the processors 704 to perform additional operations associated with the system 702. The additional modules can comprise delivery location recognition modules 710, a delivery scheduling module 712, package delivery instruction data 714, and package placement verification modules 716.

In some examples, and as noted above, the memory 708 includes delivery location recognition modules 710. In particular, the delivery location recognition modules 710 can be configured to utilize machine learning algorithms to identify identifying features within an image of a delivery location. Additionally, the delivery location recognition module 710 can be configured to compare the unique features of the image with additional images associated with a delivery location, neighboring delivery locations, and other nearby delivery locations to identify whether a deliverer has successfully located the delivery location or if further instructions are requested to place the package at the delivery location. Further, the delivery location recognition module 710 can generate a matching score between the unique feature(s) of the delivery location and the other delivery locations being compared to the delivery location. Accordingly, the delivery location recognition module 710 can determine whether the delivery location is the delivery location, a neighboring delivery location, and other delivery location based at least on the match score exceeding a threshold or other match scores associated with the various delivery location types (e.g., match score for the delivery location is higher than the match score for the neighboring delivery locations and other delivery location nearby).

In some examples, memory 708 includes delivery scheduling modules 712 that operate to identify the package within the image of the delivery location. In particular, the delivery scheduling module 712 can be configured to generate delivery schedules based at least on indications of deliverer availability, proximity of delivery locations, customer requests for delivery deadlines, and other factors that can determine a deliverer to complete delivery of a package to a delivery location.

In some examples, memory 708 includes delivery instruction data 714 that provides indications of package placement locations and/or approved drop-off locations associated with the delivery location. Additionally, the delivery instruction data 714 can include information regarding the reason for the classification of the approved drop-off location. For instance, a first approved drop-off location can be indicated as a preferred delivery location by the customer, wherein the first approved drop-off location is to be given priority for general package placement. However, a second approved drop-off location can be provided that is indicated as a large package preferred delivery location by the customer, indicating that packages over a specified size and/or weight are to be placed at the second approved drop-off location. Further, the first approved drop-off location and the second approved drop-off location can be within a package placement location associated with the delivery location. The package placement location can be a particular zone within the delivery location where packages are to be placed (e.g., a front porch, a mail room, a backyard, etc.) that can include approved drop-off locations that indicate specific placement positions for the package(s). Accordingly, the delivery instruction data 714 can be utilized to generate indication(s) of package placement locations where packages are to be placed within the delivery location and directions for navigating to approved drop-off locations within the delivery location.

In some examples, memory 708 includes package placement verification 716. In particular, the package placement verification 716 can operate as final confirmation that the package has be appropriately placed within the delivery location. In general, the package placement verification 716 can receive an image and/or other indication of the package being placed at an approved drop-off location within the delivery location. Additionally, the package placement verification 716 can determine that the package has been placed within the approved drop-off location or that the deliverer has overridden the package placement verification 716 and provided a reason for the override. For example, a gate may be locked that prevents the deliverer from placing the package within the approved drop-off location due to the approved drop-off locations being within the gate. Alternatively, or in addition, the deliverer can indicate that the approved drop-off location is associated with a high likelihood of package damage and/or loss of the package (e.g., package is exposed to rain and weather at the approved drop-off location where there is a porch that the package can be placed). Further, the deliverer can utilize the package placement verification 716 to verify that the package has been placed at the appropriate drop-off location based on package size, weight, contents, and/or other factors that the customer has utilized to distinguish between various drop-off location at the delivery location. Accordingly, the deliverer can be permitted to place the package at the delivery location and complete the delivery.

Although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
   one or more processors; and
   a memory storing one or more instructions that are executable by the one or more processors to perform operations comprising:
     receiving a delivery order that indicates that a package is to be delivered to a delivery location associated with a customer;
     receiving, from the customer and by a machine learning algorithm, customer provided information including an image depicting one or more identifying features associated with the delivery location;
     receiving, from the customer and by the machine learning algorithm, customer delivery instructions including keywords associated with navigational information that instructs a deliverer to navigate to the delivery location;
     assigning the package to the deliverer for delivery to the delivery location;
     determining, via a global position system (GPS), that the deliverer has crossed a geofence, wherein the geofence is a positional boundary configured to identify a zone associated with the delivery location;
     determining, based on the deliverer crossing the geofence, that the deliverer has arrived at an unverified location within the geofence associated with the delivery location;
     identifying, by the machine learning algorithm, the keywords within the customer delivery instructions;
     associating, by the machine learning algorithm, the keywords with the one or more identifying features based on the navigational information that instructs the deliverer to navigate to the delivery location;
     causing display of, via a deliverer device of the deliverer and based at least in part on determining, via the GPS, that the deliverer has crossed the geofence, an updated image including the one or more identifying features highlighted via the machine learning algorithm to verify that the deliverer has arrived at the delivery location;
     receiving, from the deliverer device, an indication that the unverified location of the deliverer is the delivery location associated with the package and the customer; and
     receiving, from the deliverer device, a second indication that the deliverer has placed the package at a drop-off location associated with the delivery location.

2. The system as recited in claim 1, wherein determining that the deliverer has crossed the geofence includes at least one of:
   determining, based on the GPS, that the deliverer device is within a distance threshold of the delivery location; or
   determining that a wireless fingerprint associated with the delivery location has been detected by the deliverer device.

3. The system as recited in claim 1, the operations further comprising:
   sending, to the deliverer device, instructions to instruct the deliverer to deliver a second package to a second delivery location;
   determining, based on the deliverer crossing a second geofence, that the deliverer has arrived at a second unverified location that is within the second geofence;

causing display of, via the deliverer device, additional customer provided information associated with the second delivery location, wherein the additional customer provided information includes one or more additional images of the second delivery location; and receiving, from the deliverer device, a second indication that the second unverified location is different than the second delivery location associated with the second package.

4. The system as recited in claim 1, further comprising associating the keywords with one or more images of the delivery location for the deliverer to navigate to the delivery location, wherein:
the one or more images include a first image depicting the delivery location from a street associated with the delivery location, a second image depicting a package placement location that includes the drop-off location for placement of the package, and delivery instructions for directing the deliverer to the package placement location;
the delivery location is associated with the geofence and an additional geofence, the geofence defining an outer boundary of the delivery location and the additional geofence defining the package placement location;
the deliverer device displays the delivery instructions to the deliverer in response to a determination that the deliverer has crossed the geofence; and
the deliverer device displays the second image in response to a determination that the deliverer has crossed the additional geofence.

5. The system as recited in claim 1, wherein:
the customer provided information includes an approved drop-off location for the package; and
the second indication confirms that the drop-off location where the package has been placed is the approved drop-off location.

6. A method comprising:
determining, based at least in part on a delivery order received from a customer, that a package is to be delivered to a delivery location associated with the customer;
receiving, from the customer and by a machine learning algorithm, customer provided information including an image depicting one or more identifying features associated with the delivery location;
receiving, from the customer and by the machine learning algorithm, customer delivery instructions including keywords associated with navigational information that instructs a deliverer to navigate to the delivery location;
determining, by the machine learning algorithm, that the one or more identifying features are included in the image;
identifying, by the machine learning algorithm, the keywords within the customer delivery instructions;
associating, by the machine learning algorithm, the keywords with the one or more identifying features based on the navigational information that instructs the deliverer to navigate to the delivery location;
determining, via a global position system (GPS) and based at least in part on a position of a deliverer device associated with the deliverer, that the deliverer device is within a distance threshold of the delivery location;
sending, to the deliverer device and based at least in part on determining, via the GPS, that the deliverer device is within the distance threshold of the delivery location, an updated image including the one or more identifying features highlighted via the machine learning algorithm to verify that the deliverer device has arrived at the delivery location; and
determining, based at least in part on a delivery confirmation received from the deliverer device, that the package has been placed at the delivery location.

7. The method of claim 6, further comprising:
determining, based at least in part on a plurality of images associated with the delivery location, the image depicting the one or more identifying features.

8. The method of claim 7, wherein the machine learning algorithm is configured to:
analyze delivery confirmation images to identify features, associated with the keywords, within the images.

9. The method of claim 7, wherein the machine learning algorithm is configured to receive the customer provided information and extract the one or more identifying features of the delivery location based at least in part on a dataset comprised of a plurality of identifying features associated with previous deliveries to the delivery location.

10. The method of claim 6, wherein determining, by the machine learning algorithm, that the one or more identifying features are included in the image further comprises:
determining, based at least in part on one or more previous deliveries to the delivery location, a plurality of previously identified features associated with the delivery location;
determining, based at least in part on the plurality of previously identified features, the one or more identifying features; and
generating a similarity score for the image based at least in part on a comparison of the one or more identifying features and the plurality of previously identified features.

11. The method of claim 10, wherein determining, by the machine learning algorithm, that the one or more identifying features are included in the image further comprises:
determining whether the similarity score is equal to or greater than a similarity score threshold; and
determining, based at least on the similarity score being equal to or greater than the similarity score threshold, that the image is to be provided to the deliverer for identifying the delivery location.

12. The method of claim 6, wherein the updated image is a first updated image, and further comprising:
receiving, from the deliverer device, a deliverer request for a second updated image depicting the delivery location, wherein the deliverer request indicates that the first updated image and the one or more identifying features are inaccurate for the delivery location; and
transmitting, to a customer device associated with the customer, a notification that the second updated image is requested for future deliveries to the delivery location.

13. A system comprising:
one or more processors; and
a memory storing one or more instructions that are executable by the one or more processors to perform operations comprising:
determining an image that depicts a delivery location;
receiving, in association with a customer profile associated with a customer, an indication of a package that is to be delivered to the delivery location;
determining, from the customer profile and by a machine learning algorithm, delivery instructions including keywords associated with navigational information that instructs a deliverer to navigate to the delivery location and place the package at the delivery location;

identifying, by the machine learning algorithm, the keywords within the delivery instructions;

associating, by the machine learning algorithm, the keywords with one or more identifying features associated with the delivery location based on the navigational information that instructs the deliverer to navigate the delivery location;

determining, via a global position system (GPS) and based at least in part on the delivery location, that a deliverer device associated with the deliverer is within a distance threshold of the delivery location; and causing, based at least in part on determining, via the GPS, that the deliverer device is within the distance threshold, an updated image, including the one or more identifying features highlighted via the machine learning algorithm, to be displayed via the deliverer device.

14. The system as recited in claim 13, wherein determining the image that depicts the delivery location includes at least one of:

receiving the image from a customer device that is associated with the customer profile;

receiving the image from an additional deliverer device that completed a previous delivery to the delivery location; or receiving the image from an additional device that is associated with a previous package that was delivered to the delivery location.

15. The system as recited in claim 13, wherein causing the updated image to be displayed via the deliverer device further comprises:

determining delivery location information that includes at least the distance threshold and a command that causes the deliverer device to display the updated image at a time at which the deliverer device is within the distance threshold; and providing, to the deliverer device, a geolocation tracker configured to determine whether the deliverer device is within the distance threshold.

16. The system as recited in claim 13, wherein causing the updated image to be displayed via the deliverer device further comprises:

receiving, from the deliverer device, one or more indications of a position associated with the deliverer device;

determining, based at least in part on the position and the distance threshold, that the position indicates that the deliverer device is within the distance threshold associated with the delivery location; and providing, to the deliverer device, the updated image of the delivery location.

17. The system as recited in claim 16, the operations further comprising:

determining, based at least in part on the deliverer device, that the deliverer device is within an additional distance threshold associated with placement of the package at the delivery location; and providing, via the deliverer device and based at least in part on the deliverer device being within the additional distance threshold, the delivery instructions for the package at the delivery location.

18. The system as recited in claim 13, the operations further comprising:

causing the deliverer device to capture a confirmation image of a deliverer device location;

identifying, from the image that depicts the delivery location, a first set of identifying features associated with the delivery location;

identifying, from the confirmation image, a second set of identifying features associated with the deliverer device location; and determining, based at least on the first set of identifying features and the second set of identifying features, that the deliverer device has arrived at the delivery location.

19. The system as recited in claim 18, the operations further comprising:

determining, based at least in part on the first set of identifying features and the second set of identifying features, a similarity score for the confirmation image, wherein the similarity score indicates whether the confirmation image matches the image that depicts the delivery location;

determining, based at least in part on a similarity score threshold, that the deliverer device location associated with the confirmation image is an incorrect delivery location for the customer profile; and providing, to the deliverer device, one or more directions from the incorrect delivery location to the delivery location.

20. The method of claim 6, further comprising associating, by the machine learning algorithm, the keywords with one or more images of the delivery location for the deliverer to navigate to the delivery location.

\* \* \* \* \*